US008949558B2

(12) United States Patent
Castillo et al.

(10) Patent No.: US 8,949,558 B2
(45) Date of Patent: Feb. 3, 2015

(54) COST-AWARE REPLICATION OF INTERMEDIATE DATA IN DATAFLOWS

(75) Inventors: Claris Castillo, White Plains, NY (US); Malgorzata Steinder, Leonia, NJ (US); Asser Nasreldin Tantawi, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 13/097,200

(22) Filed: Apr. 29, 2011

(65) Prior Publication Data

US 2012/0278578 A1   Nov. 1, 2012

(51) Int. Cl.
*G06F 12/00* (2006.01)
*G06F 12/02* (2006.01)
*G06F 17/30* (2006.01)
*G06F 9/50* (2006.01)

(52) U.S. Cl.
CPC .............. *G06F 12/02* (2013.01); *G06F 17/30* (2013.01); *G06F 9/5066* (2013.01); *G06F 17/30575* (2013.01)
USPC ........................................................ 711/162

(58) Field of Classification Search
CPC ... G06F 9/5066; G06F 9/5072; G06F 9/5083; G06F 9/5088
See application file for complete search history.

(56) References Cited

U.S. PATENT DOCUMENTS

| 7,668,878 | B2 | 2/2010 | Arora et al. | |
|---|---|---|---|---|
| 7,788,224 | B2 | 8/2010 | Fleck et al. | |
| 2004/0254962 | A1 | 12/2004 | Kodama et al. | |
| 2004/0254964 | A1 | 12/2004 | Kodama et al. | |
| 2011/0161294 | A1* | 6/2011 | Vengerov et al. | 707/637 |
| 2012/0167101 | A1* | 6/2012 | Kandula et al. | 718/102 |

OTHER PUBLICATIONS

Ko et al., "On Availability of Intermediate Data in Cloud Computations", USENIX Association, HotOS'09: Proceedings of the 12th conference on Hot topics in Operating systems, May 2009.*
Zheng, Qin, "Improving MapReduce Fault Tolerance in the Cloud", Apr. 19-23, 2010, 2010 IEEE International Symposium on Parallel & Distributed Processing, Workshops and Phd Forum (IPDPSW), pp. 1-6.*
Dasgputa, G., et al., Data-Wise: Efficient management of data-intensive workflows in scheduled grid enviornments, Network Operations and Management Symposium, 2008, Apr. 7-11, 2008, pp. 498-495, IEEE, Salvador, Bahia.

(Continued)

*Primary Examiner* — April Y Blair
*Assistant Examiner* — Michael C Kolb
(74) *Attorney, Agent, or Firm* — Ference & Associates LLC

(57) ABSTRACT

Described herein are methods, systems, apparatuses and products for cost-aware replication of intermediate data in dataflows. An aspect provides receiving at least one measurement indicative of a reliability cost associated with executing a dataflow; computing a degree of replication of at least one intermediate data set in the dataflow based on the reliability cost; and communicating at least one replication factor to at least one component of a system responsible for replication of the at least one intermediate data set in the dataflow; wherein the at least one intermediate data set is replicated according to the replication factor. Other embodiments are disclosed.

22 Claims, 17 Drawing Sheets

(56) References Cited

OTHER PUBLICATIONS

Zinn, D., et al., "X-CSR: Dataflow Optimization for Distributed XML Process Pipelines", 25th International Conference on Data Engineering, May 29-Apr. 2, 2009, pp. 577-580, IEEE, Shanghai, China.
Jin, C., et al., "A Dataflow System with a Local Optima-based Scheduling for Enterprise Grids", Feb. 7, 2008, 15 pages, CiteSeerX Digital Library, United States, available at http://citeseerx.ist.psu.edu/viewdoc/summary?doi=10.1.1.80.1962, as of Apr. 18, 2011.
Website—available at http://www.informaticacloud.com/solutions/data-replication.html, as of Apr. 18, 2011, 2 pages.
Website—available at https://wiki.duraspace.org/display/duracloud/DuraCloud, as of Apr. 18, 2011, 3 pages.
Website—available at http://wiki.apache.org/handoop/Hadoop-Presentations, as of Apr. 18, 2011, 6 pages.
Dean, J., et al., "MapReduce: Simplified Data Processing on Large Clusters", 6th Symposium on Operating System Design and Implementation (OSDI 2004), Dec. 6-8, 2004, pp. 1-13, San Francisco, California, USA.
Ko, S., et al., "On Availability of Intermediate Data in Cloud Computations", 12th Workshop on Hot Topics in Operationa Systems, Jun. 2009, pp. 1-10, San Diego, CA, USA.
MacCormick, J., et al., Boxwood: Abstractions as the Foundation for Storage Infrastructure, 6th Symposium on Operating System Design and Implementation (OSDI 2004). Dec. 6-8, 2004, 16 pages, San Francisco, California, USA.
Thusoo, A., et al., "Data Warehousing and Analytics Infrastructure at Facebook", SIGMOD'10, Jun. 6-10, 2010, pp. 1013-1020, Indianapolis, Indiana, USA.

* cited by examiner

US 8,949,558 B2

COST-AWARE REPLICATION OF INTERMEDIATE DATA IN DATAFLOWS

FIELD OF THE INVENTION

The subject matter presented herein generally relates to systems for data intensive processing, and ensuring the reliability thereof.

BACKGROUND

The landscape of data intensive processing has evolved significantly. Such processing has now become much more pervasive and is accessible to a broader user population. Several factors are responsible for this development. First, there is tremendous growth in the volume of available data resulting from the proliferation of devices. Second, the data storage costs have reduced dramatically making it cost-effective for institutions and individuals to retain large volumes of data. Third, new programming paradigms, such as Map-Reduce and Pig, have emerged that enable efficient processing of large data sets on clusters of commodity hardware. Open-source implementations of these paradigms such as Hadoop have further promoted this trend.

Commodity computing is a key enabler in the development and success of large-scale data analytics in a Cloud environment. This paradigm enables "scaling out" by adding inexpensive computing nodes (machines) as a solution to the scalability problem. This has resulted in frequent failures that have become a rule rather than an exception in typical Cloud environments. For example, in the context of data analytics, Google Inc. has reported at least one disk failure in every run of a 6-hour Map-Reduce job on a cluster of 4,000 machines. Not surprisingly, fault tolerance is considered a primary goal in the design and development of middleware and application software that processes data on such a large scale. The performance degradation resulting from failures as well as the cost for handling such failures depends on the nature of the application and its corresponding requirements.

Replication is one mechanism that has been widely used to improve data availability in data-intensive applications. The availability of intermediate data is important to the performance of dataflows, since lost intermediate has to be regenerated for the dataflow to advance. Therefore, in order to recover from a single failure, multiple stages that were previously executed in the dataflow may have to be re-executed.

BRIEF SUMMARY

One aspect provides a computer program product comprising: a computer readable storage medium having computer readable program code embodied therewith, the computer readable program code comprising: computer readable program code configured to receive at least one measurement indicative of a reliability cost associated with executing a dataflow; computer readable program code configured to compute a degree of replication of at least one intermediate data set in the dataflow based on the reliability cost; and computer readable program code configured to communicate at least one replication factor to at least one component responsible for replication of the at least one intermediate data set in the dataflow; wherein the at least one intermediate data set is replicated according to the replication factor.

Another aspect provides a method comprising: receiving at least one measurement indicative of a reliability cost associated with executing a dataflow; computing a degree of replication of at least one intermediate data set in the dataflow based on the reliability cost; and communicating at least one replication factor to at least one component of a system responsible for replication of the at least one intermediate data set in the dataflow; wherein the at least one intermediate data set is replicated according to the replication factor.

A further aspect provides a system comprising: at least one processor; and a memory device operatively connected to the at least one processor; wherein, responsive to execution of program instructions accessible to the at least one processor, the at least one processor is configured to: receive at least one measurement indicative of a reliability cost associated with executing a dataflow; compute a degree of replication of at least one intermediate data set in the dataflow based on the reliability cost; and communicate at least one replication factor to at least one component responsible for replication of the at least one intermediate data set in the dataflow; wherein the at least one intermediate data set is replicated according to the replication factor.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
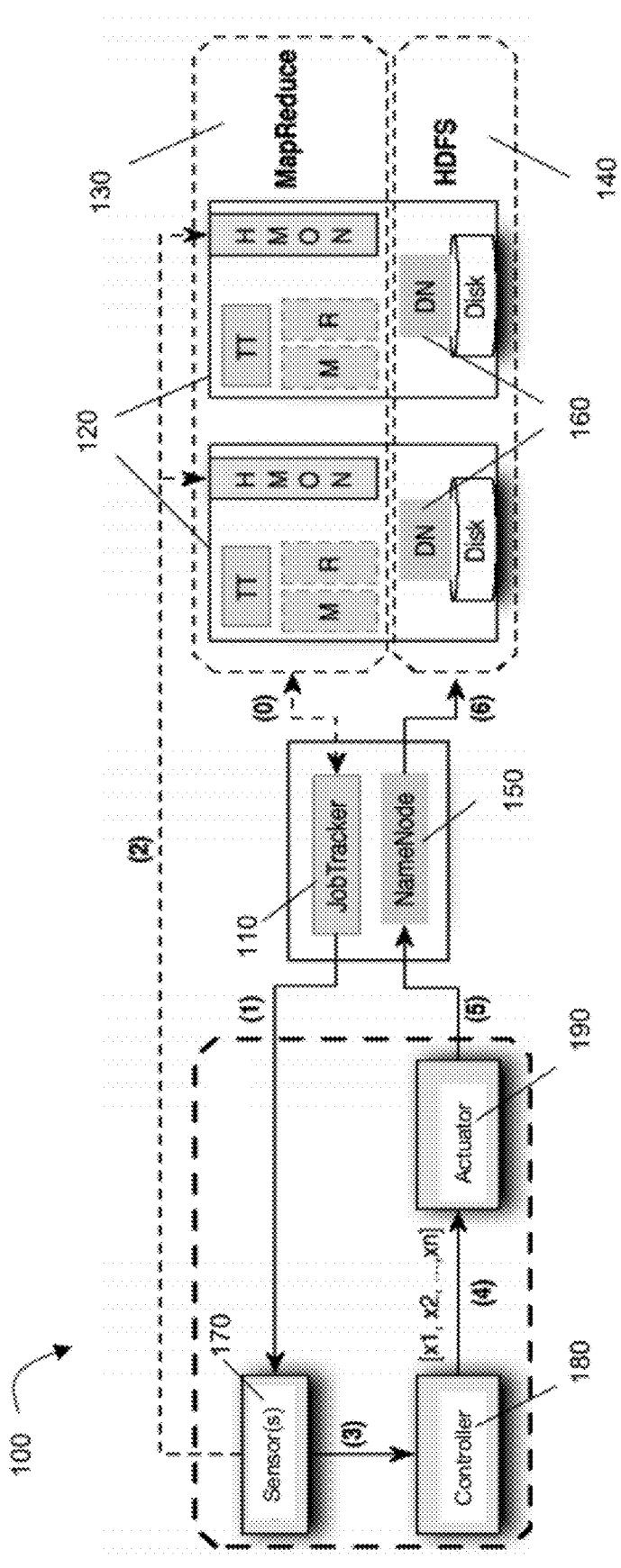
FIG. 1 illustrates an example system for cost-aware replication of intermediate data in dataflows.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

The cost paid to provide for reliability in large-scale data analytic environments might be excessive if this cost is not well understood. This is an important consideration, as system providers seek to reduce cost by relying on commodity hardware to build their infrastructures. Given a dataflow with a set of stages, it is important to determine when it is cost-effective to replicate data.

To address such cost issues, a metric is defined herein to capture reliability cost. This metric represents the price paid by either the infrastructure or the user to handle failures that result in unavailable input data of a given stage. This cost is effectively comprised of two sub-costs. The first is regeneration cost, that is, the price paid for re-executing a task for which output data has been lost and re-execution is needed to advance in the dataflow. The second is replication cost, that is, the price paid for creating replicas of the data in order to reduce the likeliness of losing data in the presence of failures. In the former, the price is a measure of the amount of resources needed to re-execute stages. In the latter, the price is a measure of the resources needed to store and maintain replicas in the system. In practice, it is challenging to understand the cost of regeneration for a given dataflow in the presence of failure due to the data and temporal dependencies between stages. Therefore, to provide for data availability, existing data analytic platforms implement replication techniques that may not be appropriate. Furthermore, existing techniques usually assume over-provisioning of storage resources and tend to over-replicate. For instance, in a typical Hadoop cluster intermediate data of a dataflow is replicated thrice by default.

Accordingly, an embodiment provides for minimization of the reliability cost. The minimum reliability cost problem may be formulated as an integer programming optimization problem with nonlinear convex objective functions. The optimal solution to this problem dictates the replication factor of intermediate data upon completion of its corresponding stage without a priori knowledge of future (downstream) stages. To find such a solution, an embodiment takes into account the probability of loosing data, the cost of replication, the storage capacity available for replication, and/or the current resource utilization in the system. Upon completion of a stage in the dataflow, An embodiment may reconsider replication decisions made at the previous stages to ensure that a local optima is achieved at each stage, while satisfying any storage constraint(s).

An example embodiment is described in detail herein with an implementation as a decision layer on top of Hadoop that makes intelligent replication decisions as the dataflow advances towards completion. Hadoop has been chosen as an example since it is the de-facto data-analytic platform in use today by industry and academic community. Within this framework is considered a data-analytic platform where dataflows consist of compute stages, where each stage is a Map-Reduce job (tuple). Nonetheless, those having ordinary skill in the art will readily understand that other embodiments may be implemented using any data-analytic platform that relies on replication to provide for data-availability of dataflows.

The description now turns to the figures. The illustrated example embodiments will be best understood by reference to the figures. The following description is intended only by way of example and simply illustrates certain example embodiments representative of the invention, as claimed.

Hadoop Map-Reduce

The Hadoop Map-Reduce engine is a Java-based platform that supports the Map-Reduce programming model. A Map-Reduce job specifies a map function, which transforms a job input record into a set of key/value pairs, and a reduce function, which transforms an intermediate key and the set of all values associated with that key into the job output record. The Map-Reduce layer uses a cluster of nodes (machines) to run Map-Reduce jobs.

FIG. 1 illustrates an example system 100 incorporating a Hadoop system architecture for an example embodiment. One node 110 runs the JobTracker, which organizes the cluster's activities. The other (worker) nodes 120 each run a TaskTracker (TT in FIG. 1), which organizes a worker node's activities. The TaskTracker is configured with a number of map and reduce tasks to run concurrently, and pulls new tasks from the JobTracker as old ones finish. Each task is run in a separate process. A job is organized into two sequential tiers of map tasks and reduce tasks. The Hadoop Map-Reduce layer 130 stores intermediate data produced by the map tasks and consumes reduce tasks in the local file systems 140 of the machines running the map and reduce functions.

Hadoop Distributed File System (HDFS)

HDFS 140 is a distributed file system designed to provide high streaming throughput to large, write-once-read-many-times files. A HDFS 140 uses one unique server, the Primary-Namenode 150 and a Secondary-Namenode as backup (not shown). The file system 140 is built from a cluster of DataNodes 160, each of which serves up blocks of data over the network using a HTTP based protocol. These components are illustrated in FIG. 1, with DataNodes 160 being denoted by DN.

HDFS 140 is designed to run on a collection of commodity machines, thus it is designed with fault tolerance in mind. A file is stored as a sequence of blocks; typical block sizes are 64 MB and 128 MB. Each block is replicated across multiple Datanodes 160. In a conventional arrangement, the default replication value would be three (3). Replicas are distributed so that one copy is local to the client and two other copies are stored remotely.

Replication is performed in a pipelined fashion. Data is first written to a local file. When the local file accumulates a full block of user data, the client retrieves a list of DataNodes 160 from the NameNode 150. This list contains the DataNodes 160 that will host a replica of that block. The client then flushes the data block to the first DataNode. The first DataNode starts receiving the data in small portions (4 KB), writes each portion to its local repository and transfers that portion to the second DataNode in the list. This process repeats until the last replica is created. Consequently, a file can not be accessed until all replicas are done.

Figure 2:
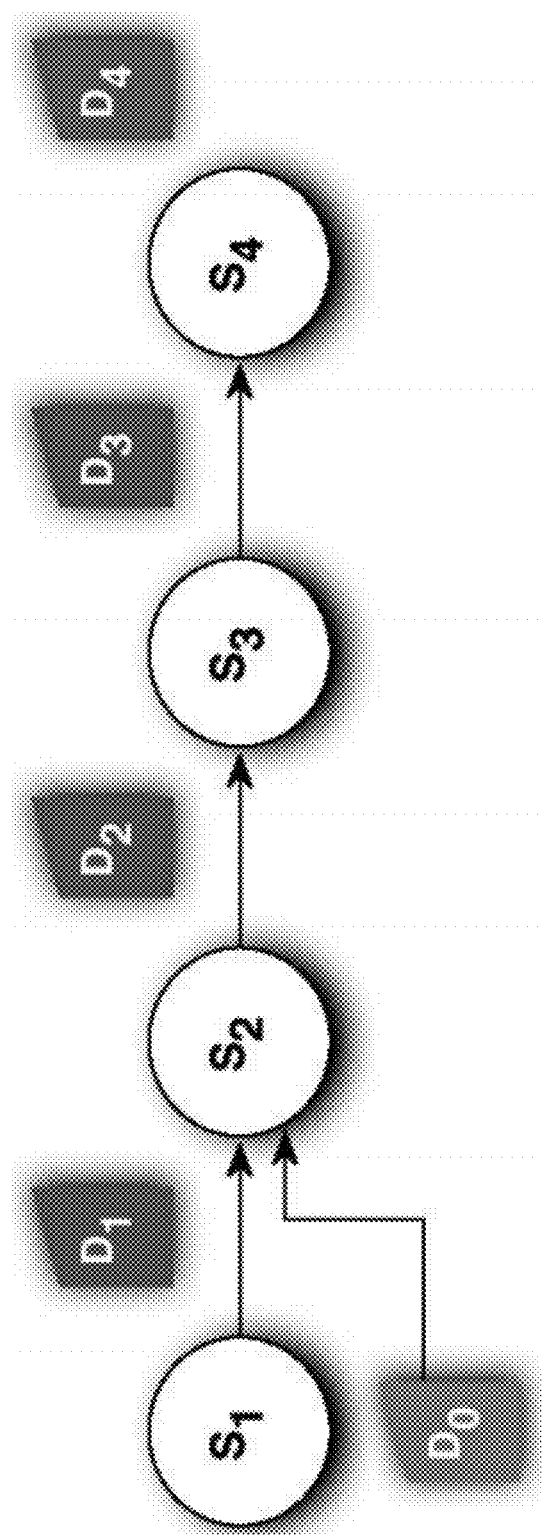
FIG. 2 illustrates an example dataflow.

For the a non-limiting examples described herein, a real testbed is used, consisting of a Hadoop-0.20.2 cluster with 25 VMs hosted in a Cloud-environment. Each VM has RHEL5.3, 4 2.9 GHz CPUs, and 350 GB of storage. The workloads in the non-limiting examples include a real MapReduce dataflow consisting of 4 stages, Tagger, Join, Grep and RecordCounter. FIG. 2 depicts these stages as $S_1$, $S_2$, $S_3$ and $S_4$, respectively.

In $S_1$, Tagger pre-processes by tagging an input data set consisting of records. This is an I/O intensive workload that outputs 170 GB of data as input to the second stage, $S_2$. In $S_2$, Join consists of a standard table join operator that joins the table output by Tagger with a dimensional table previously stored in the HDFS 140. The fact and dimensional table are 170 GB and 115 GB, respectively. Join is I/O intensive, but more CPU intensive as compared to Tagger. In $S_3$, Grep is considered a representative workload for data analytics and consists of a simple operation that looks for records that match a given regular expression in the output of the Join stage, $S_2$. This stage generates 100 GB. In $S_4$, RecordCounter counts all records with a common field. RecordCounter outputs 70 GB of data.

For an example embodiment, to quantify the cost resulting from replication of intermediate data in dataflows, end-to-end completion time is considered. It should be noted, however, that any measurement used depends on the particular replication technique and various characteristics of the system. Without any loss of generalization, the examples described herein can be safely extrapolated to include other platforms. Note that in this description, the focus is on quantifying the cost paid to provide for data availability in dataflows, or in other words, the reliability cost.

This description focuses on three types of cost. Replication cost represents the cost of replicating intermediate data in a dataflow expressed in terms of resource usage, time or any other relevant metric. Regeneration cost estimates the cost to regenerate the intermediate data in case of failure. Reliability cost considers both the replication cost and the regeneration cost in estimating the effective cost of handling failures in the system. Note that it is assumed that data that has been lost is regenerated (and is needed as input to a stage).

A replication factor map (RFM) is additionally defined as the sequence of replication factors for all the stages in a dataflow. For example, given a 4-stage dataflow, an RFM of 0011 corresponds to the case in which only the third and fourth stages of the dataflow (corresponding to $D_3$ and $D_4$ in FIG. 2, respectively) were replicated. Also considered are 0000 and 1111, two special cases of RFM, as they implement two extremes replication strategies: no-replication (NR) and full-replication (FR), respectively.

Replication Cost and Benefit

Figure 3A:
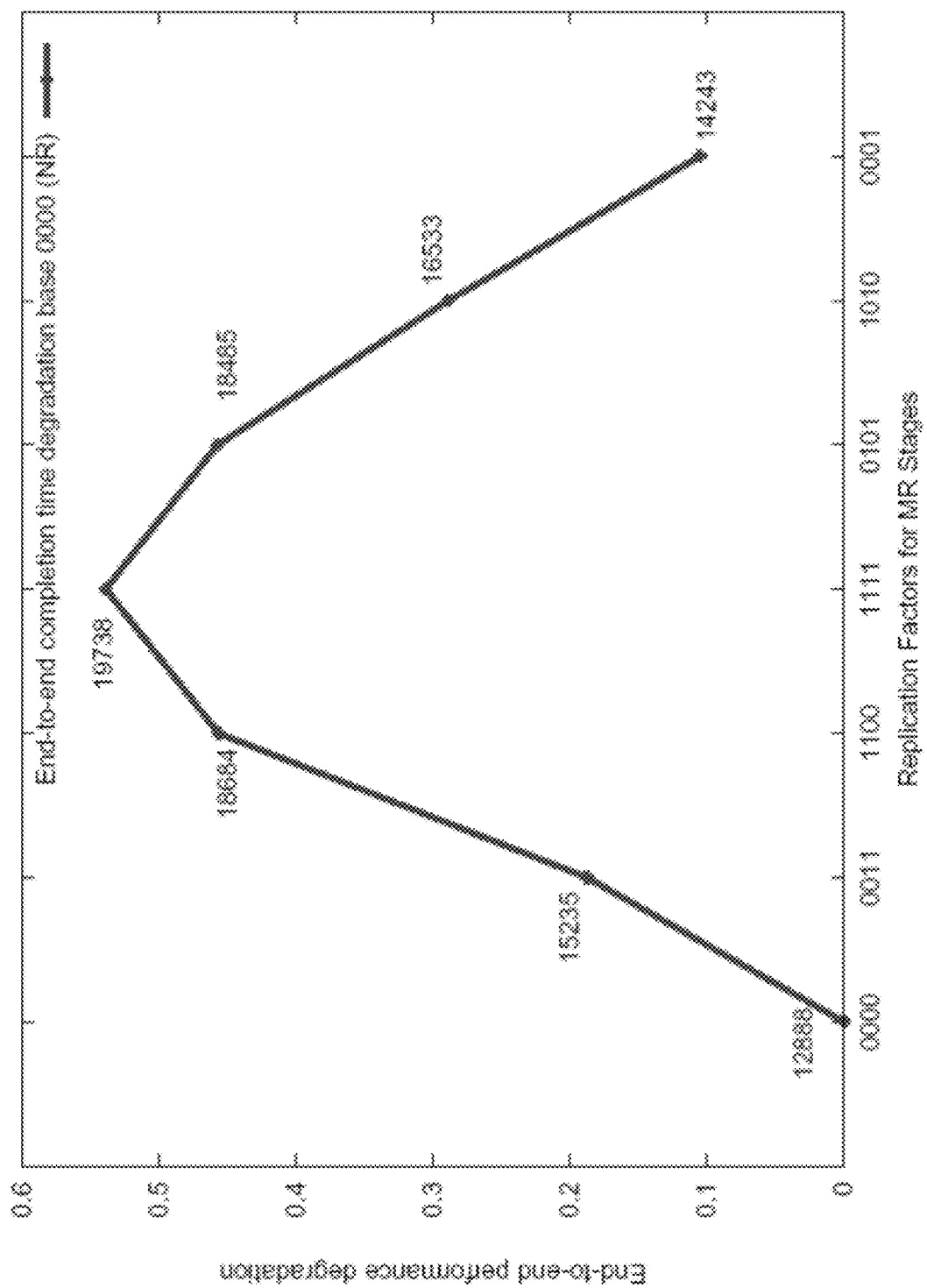
FIG. 3A illustrates end-to-end performance degradation as a function of differing replication factors.

As an example of replication cost and benefit, the end-to-end performance of the example 4-stage dataflow under various replication strategies may be analyzed. To do this, the dataflow is executed with a predefined RFM and its end-to-end completion time is measured. Since an aim is to quantify the cost of replication for the dataflow, the degradation resulting from replication using RFM=0000 (NR) is calculated as a baseline. The results are plotted (average of 3 rounds) in FIG. 3A. In FIG. 3 A, the x-axis depicts the RFM of choice.

As observed from FIG. 3A, data availability comes at a cost to the end-to-end performance, depending on the level of replication considered. In this example, the degradation peaks at 0:53 when the replication strategy is FR. This behavior follows intuition since intermediate data is replicated for all intermediate stages for this case. For other RFM values, such as 0001 and 0010, the performance degradation is much lower, since these cases result in the replication of a smaller amount of intermediate data as compared to when the replication strategy is FR. It can further be observed in FIG. 3A that RFM values of 1100 and 0101 show approximately same degradation ratios. This result is counter-intuitive since for RFM=1100 the intermediate data replicated is about 1:58 times larger than for RFM=0101.

Figure 3B:
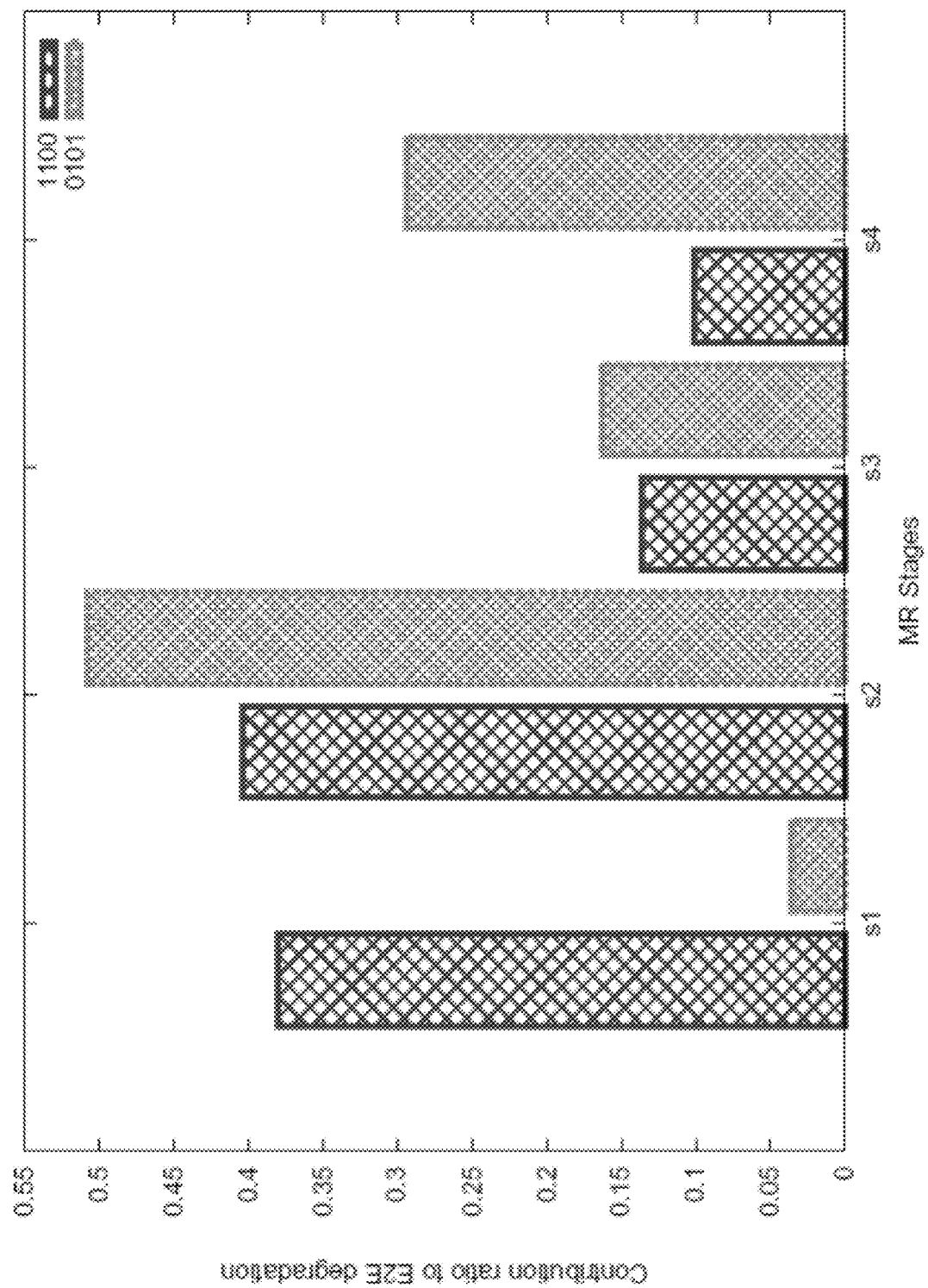
FIG. 3B illustrates contribution to end-to-end performance degradation due to replication at various stages in an example dataflow.

To investigate the causes behind this observation the completion time of the dataflow is broken down in Table I, which plots the execution time for the four stages and the end-to-end job completion time for the RFM values of NR, 1100 and 0101. FIG. 3B plots the fractional contribution of each stage to the total increase in end-to-end job completion time. Comparing the two cases of RFM=1100 and RFM=0101, it can be observed that (as expected) the completion time of $S_1$ increases for the case RFM=1100 when compared to RFM=0101. It is noticeable that although $S_1$ only contributes 14% to the total time of the dataflow in the NR strategy (see Table I), its completion time constitutes about 39% of the total degradation of the dataflow when $D_1$ is replicated for RFM=1100 (see Table I). Different conclusions can be reached from these observations depending on which cost metric is considered. If the cost metric of interest is time, the re-execution cost outweighs the replication cost since it takes longer to replicate A than to re-execute $S_1$ later if a failure causes $D_1$ to be lost. If on the other hand, a case is considered wherein there is a limited budget for a given resource associated with the dataflow, for example CPU, then it is plausible that regeneration cost outweighs the replication cost and hence replicating $D_1$ is the cost conscious decision.

TABLE I

Completion time in seconds for individual MR stages and end-to-end time of dataflow.

| RFM | $t_1$ | $t_2$ | $t_3$ | $t_4$ | T |
| --- | --- | --- | --- | --- | --- |
| NR | 1823 | 2759 | 4547 | 3759 | 12888 |
| 1100 | 4022 | 5097 | 5219 | 4346 | 18684 |
| 0101 | 1824 | 5703 | 5493 | 5465 | 18485 |

Thus, the cost of providing reliability for dataflows varies depending on the chosen replication strategy. With de-facto full-replication available in standard distributed file systems such as HDFS, costs as high as 50% are possible when time is considered as metric of cost. Also, when making replication decisions, one should carefully consider the trade off between the cost of replicating intermediate data and the cost of regenerating that data in the presence of failure. Furthermore, the choice of cost metric is important in making replication decisions in dataflows.

Accordingly, an embodiment provides a replication decision that leads to a minimum reliability cost for the dataflow in question without knowledge of downstream stages. This problem may be formulated as follows.

Problem Statement

Consider job J (also referred to as a dataflow) which consists of n stages in sequence $S_i$, i=1, 2, . . . , n. Stage $S_i$ uses data generated from its predecessor stage $S_{i-1}$ and generates data $D_i$ to be consumed by its successor stage $S_{i+1}$. $S_0$ and $S_{n+1}$ are not real stages, rather they refer to the input and output processes of job J. It is assumed that data $D_0$ is available as input to job J and $D_n$ is its output. The storage size of data $D_i$ is denoted by $Y_i$ storage units and the time it takes to store $D_i$ is $E_i=\delta Y_i$, where $\delta$ is the speed of storing a data unit (using time and cost interchangeably). At the conclusion of stage $S_i$, data $D_i$ is stored as a copy referred to as the original copy. Further, additional $x_i \geq 0$ copies of $D_i$ are stored as replicas of the original copy in case the latter (or any of the replicas) is lost due to failure. Note that $D_0$ is assumed to be reliably stored. The processing time (that is, the time needed to process $D_{i-1}$, perform any necessary computation during $S_i$, generate $D_i$, and store an original copy) is denoted by $A_i$. Further, the replication time needed to store the $x_i$ replicas is denoted by $R_i$, where $$R_i = x_i E_i.$$

The storage devices where data (original or replica) is stored are subject to failures. The following failure model is assumed for ease of description. Consider a piece of data $D_i$ that is stored as $b_i \geq 1$ blocks. The number of blocks $b_i$ is a function of the block size $o_i$ and the size of the file $Y_i$. More specifically, $$b_i = \frac{Y_i}{o_i}.$$

A single block fails independently of other blocks with probability p. A file is corrupted if at least one of its blocks fails. Given $x_i \geq 1$ as the number of replicas, all replicas are corrupted, hence $D_i$ is unavailable (failed) if at least all $x_i$ replicas of a given block fail. Let $f_i(x_i)$ denote the conditional failure probability of $D_i$. Thus:

$$f_i(x_i) = 1 - (1-p^{x_i})^{b_i}.$$

As long as at least one copy (original or replica) of $D_{i-1}$ is available, stage $S_i$ proceeds and its processing is unaffected. However, if all copies of $D_{i-1}$ are lost, stage $S_{i-1}$ is re-invoked in order to regenerate data $D_{i-1}$ and its replicas. Denoting with $G_{i-1}$ the expected time to regenerate $D_{i-1}$ and its replicas ($G_0=0$), let the expected total stage time for $S_i$ be $T_i$. $T_i$ is given by:

$$T_i = A_i + R_i + G_{i-1}.$$

The expected regeneration time $G_i$ is given by:

$$G_i = f_i(x_i+1) T_i$$

since $f_i(x_i+1)$ is the probability of losing all $x_i+1$ copies of $D_i$ (replicas and original) and $T_i$ is the expected time to regenerate $D_i$ and store it along with $x_i$ replicas. Note that $T_i$ includes any potential loss of data of predecessor stages in a recursive manner.

The total job execution time, denoted by T, is the sum of all n stage times, $$T = \sum_{i=1}^{n} T_i$$

which includes the total processing time, the total replication time, and the total expected regeneration time due to failures of all n stages, that is:

$$T = A + R + G$$

where A is the job processing time, R is the job replication additional cost (penalty), and G is the job expected regeneration additional cost, and each is given by:

$$A = \sum_{i=1}^{n} A_i, \quad R = \sum_{i=1}^{n} R_i, \quad G = \sum_{i=1}^{n-1} G_i,$$

respectively. Note that a variation of the above definition of the regeneration cost G may include $G_n$ in case the job output $D_n$ is also subject to failure, which necessitates its regeneration. In such a case $G = \sum_{i=1}^{n} G_n$. Defining the reliability cost, Z, as the additional cost due to replication and regeneration, $$Z = R + G \quad (1)$$

The total storage needed for all replicas is given by:

$$Y = \sum_{i=1}^{n} x_i Y_i$$

Note that the choice of the replication vector $X = [x_1 x_2 \ldots x_n]$ impacts the values of the replication and regeneration additional costs, R and G, respectively, as well as the storage need, Y. Intuitively, the more replicas, the higher the replication cost and storage need, and the lower the regeneration cost. This gives rise to an optimization problem in order to determine an optimal value of X. However, before describing the optimization problem, the temporal aspect of data replication is described.

Dynamic Replication

So far, the replication factor, $x_i$, for stage $S_i$ has been considered as a static variable during the entire duration of the job. In general, one might change the value of $x_i$ dynamically as the job progresses through its various stages. For instance, reducing the replication factor of an earlier stage as higher stages execute may make sense in order to allow more recent data to be replicated. To allow for dynamic replication, the notation is extended as follows.

When the job finishes executing stage $S_k$, the job is in step k; where k=1, 2, ..., n. The replication factors at step k are denoted by $x_i(k), i=1, 2, \ldots k$. In other words, after stage $S_k$ completes, data generated at stage $S_i, i=1, 2, \ldots k$, is replicated with a factor $x_i(k)$, leading to a lower triangular matrix of variables, denoted by X. Thus, dynamic replication gives rise to $n(n+1)/2$ replication factor variables.

An increase from $x_i(k)$ to $x_i(k+1)$ means that data $D_i$ needs more replicas. Whereas, a decrease means giving up storage space taken by $D_i$, potentially in favor of replicating more "valuable" data. The replication cost at step k is given by:

$$R(k) = x_k(k) E_k + \sum_{j=1}^{k-1} (x_j(k) - x_j(k-1) + E_j)$$

where the first term is the replication cost of stage $S_k$ and the second term is the additional replication cost from step k−1 to step k due to any increase in the replication factors of stages $S_j, j=1, 2, \ldots k-1$, assuming that removing (demoting) replicas does not incur any significant cost. Note that the second term is zero for k=1 and $x_j(0)=0$.

The expected regeneration cost at step k involves the handling of potential failures of data $D_{k-1}$ during the execution of stage $S_k$, that is:

$$G(k)=f_{k-1}(x_{k-1}(k-1)+1)T_{k-1}(k-1)$$

where $$T_i(k)=A_i+R_i(k)+G_{i-1}(k),$$

$$R_i(k)=(x_i(k)-x_i(k-1))+E_i,$$

and $$G_{i-1}(k)=f_{i-1}(x_{i-1}(k-1)+1)T_{i-1}(k-1).$$

Let $Z(k)=R(k)+G(k)$. The total replication and regeneration costs are given by:

$$R = \sum_{k=1}^{n} R(k), \quad G = \sum_{k=2}^{n} G(k),$$

respectively, and their sum is Z as given in equation (1). At step k, the storage constraint is given by:

$$Y(k) = \sum_{i=1}^{k} x_i(k)Y_i \leq C,$$

where C is the total available storage capacity for replication.

Optimization Problem

The assumption of whether the parameters (n, A, Y, ... ) of job J are know a priori or only the parameters related to each stage become known at (or about) the completion of each stage is important in determining the nature of the optimization problem. Accordingly, two optimization criteria are differentiated: job optimality (JO) and stage optimality (SO).

In job optimality, the knowledge of all job parameters is assumed before the job starts. In such a case, the objective would be to choose the replication matrix X so as to minimize the total expected cost Z subject to replication storage constraint. Thus, the problem is:

$$\min_{X} Z \text{ s.t. } Y(k) \leq C, k = 1, 2, \ldots, n.$$

In stage optimality it is assumed that the parameters related to each stage become known at (or about) the completion of each stage. In such a case, at step k, which coincides with the completion of stage $S_k$, k=1, 2, ..., n, the decision variables $X(k)=\{x_i(k), i=1, 2, \ldots, k\}$ are determined. Note that, at step k, one may alter earlier choices of replication given the current conditions and available storage. The criterion is to minimize the incremental replication cost and the regeneration cost in case a failure occurs to $D_k$. Thus, the problem at step k is:

$$\min_{X(k)} Z \text{ s.t. } Y(k) \leq C.$$

Given the equations above, it is noted that both the job and stage optimality problems are integer programming problems with nonlinear convex objective functions. Optimal numerical solutions are described further herein.

Minimizing Resource Utilization

The problem formulation is stated with time (processing time, replication time, regeneration time, et cetera) as the measure of concern. More generally, each stage of the job involves usage of various resources. For instance, the execution of a stage consumes CPU (user as well as system cycles), disk (read and write operations), network (transmit and receive packets), and storage of produced data and its replicas. The usage of each of these resources may incur costs that differ from stage to stage during the job execution. Hence, one may be concerned with minimizing cost rather than time; however, the problem formulation remains the same.

Let K be the number of resources used during the execution of a stage. for example, K=4, considering CPU, disk, network, and storage resources. Denoting the usage of resource k during stage $S_i$ in units of that resource by $u_{i,k}$, k=1, 2, ..., K, in order to make usage uniform among the resources, the usage is normalized by defining $\rho_{i,k}$ as:

$$\rho_{i,k} = \frac{u_{i,k}}{\sum_{j=1}^{n} u_{j,k}}, k = 1, 2, \ldots, K,$$

so that $\Sigma_{i=1}^{n}\rho_{i,k}=1$ for all resources. The relative costs of resources is represented by weights $\omega_k$, k=1, 2, ..., K, in such a way that one resource (say k=1, without loss of generality) has a standardized unit weight. Thus, the unit cost is the total job usage of that resource. The weights of the other resources are expressed in terms of their relative costs to the cost of the standardized resource. Thus, $A_i$ in the above problem formulation is given by:

$$A_i = \sum_{k=1}^{K} \omega_k(k)\rho_{i,k}$$

Similarly, $R_i$ may be expressed as the cost of replication. Hence, this would be minimizing total job cost, replication cost, and regeneration cost, instead of total job time, replication time, and regeneration time. In either case, the variables are the same, namely the number of replicas taken at the conclusion of each stage of the job.

To summarize, a formulation to the minimum reliability cost for dataflows is provided. Particularly, the stage optimization (SO) formulation assumes no a priori knowledge of the dataflow.

Analysis

An example parametric analysis is used to describe the optimal solution to the SO problem as it compares to standard replication strategies adopted in practice, such as full replication (FR). Various parameters of interest in real systems are considered and their trade-offs investigated by way of example.

Replication cost (R), regeneration cost (G) and reliability cost (Z), as defined herein, are used as comparative cost metrics. R represents the cost of generating the initial replicas and does not include the cost involved in creating new replicas when intermediate data is re-generated in the presence of failure. G involves the cost of re-execution of stages due to failures and their corresponding replication decisions. Z is the sum of R and G, and corresponds to the overall cost of providing reliability in the system. In some examples used herein, only G and R are plotted, since Z alone does not differentiate the strategies adequately in terms of performance. While two strategies may have similar values for Z, they might differ significantly in their value of R and G. In other words, the cost of reliability may come at different replication and regeneration costs.

The input to the problem is a dataflow consisting of multiple stages in sequence. For the ease of analysis and with no loss of generalization, 4 stages are used as an example and represented as $S_1, S_2, S_3$ and $S_4$ (as illustrated in FIG. 2). Note that analyses with larger number of stages show similar results. Time was used as the cost metric for these examples. A stage $S_i$ is represented by the tuple <$D_i, C_i$>, where $D_i$ and $C_i$ correspond to output data size and computing resources of the stage, respectively. It is assumed herein that one unit of computing resources requires one unit of time. The system is represented by the tuple <$\delta, p$>, where $\delta$ corresponds to the time required by the system to replicate one data unit and p is the probability of a replica being unavailable due to failure, as described herein.

An example embodiment is compared with two baseline strategies: full replication (FR) and no replication (NR). FR corresponds to the default replication technique used in existing Hadoop-based platforms, in which intermediate data is replicated thrice for every stage. NR corresponds to the strategy in a Hadoop cluster where replication is disabled.

In the example analyses, unless stated differently, a scenario with the following configuration: $p=0.2, C=\infty$ and $\delta=0.2$ is considered. The value of $\delta$ was chosen so that R does not outweigh G. The value $p=0.2$ characterizes a reasonably reliable system. The impact of each individual parameter on the performance of the replication strategies is further described herein. The reasoning for choosing $C=\infty$ is that by relaxing the storage constraint for replication, the aim at reproducing typical Hadoop clusters that are over-provisioned in terms of storage is achieved. For each stage $S_i$, $C_i$ is obtained from a uniform distribution $U=(1, C_{Max})$ where $C_{Max}=100$ unless specified otherwise. Similarly, $D_i$ is also obtained from a uniform distribution $U=(1, D_{Max})$ where $D_{Max}$ may vary within the range $(1, C_{Max})$ in order to control the ratio between storage and computing resources required for a dataflow.

First, the impact of varying the ratio between storage and computing resources ($D_{Max}$) on the performance of the replication strategies is described. FIG. 4(A-C) plots the varying costs for FR, NR and an example embodiment as $D_{Max}$ is varied for values of $\delta$. For example, "CD-0.2" in the key refers to an example embodiment implementing a strategy with $\delta=0.2$, likewise for "CD-0.4", $\delta=0.4$. Multiple observations can be drawn from FIG. 4(A-C).

Figure 4A:
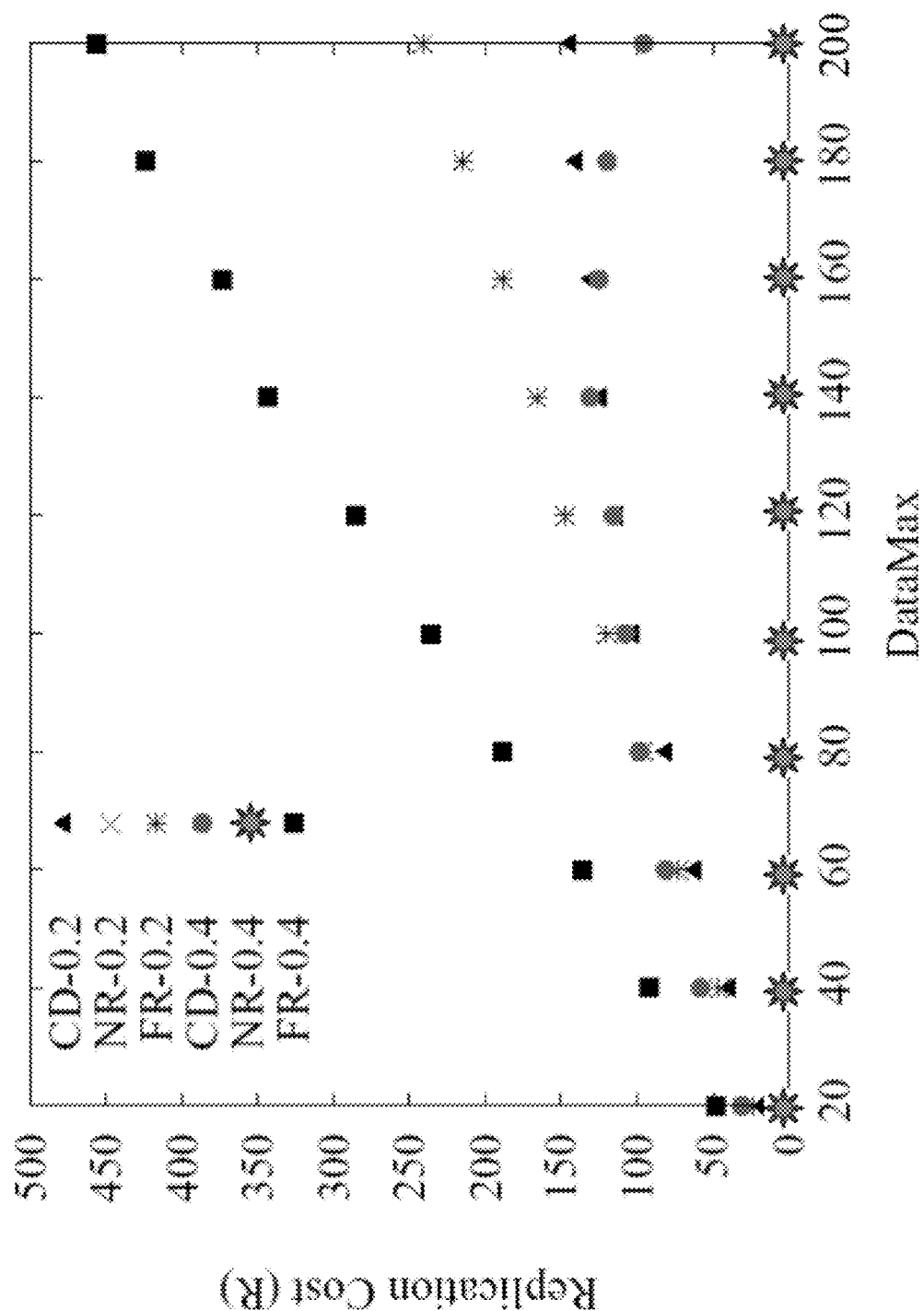
FIG. 4A illustrates examples of replication costs.
Figure 4B:
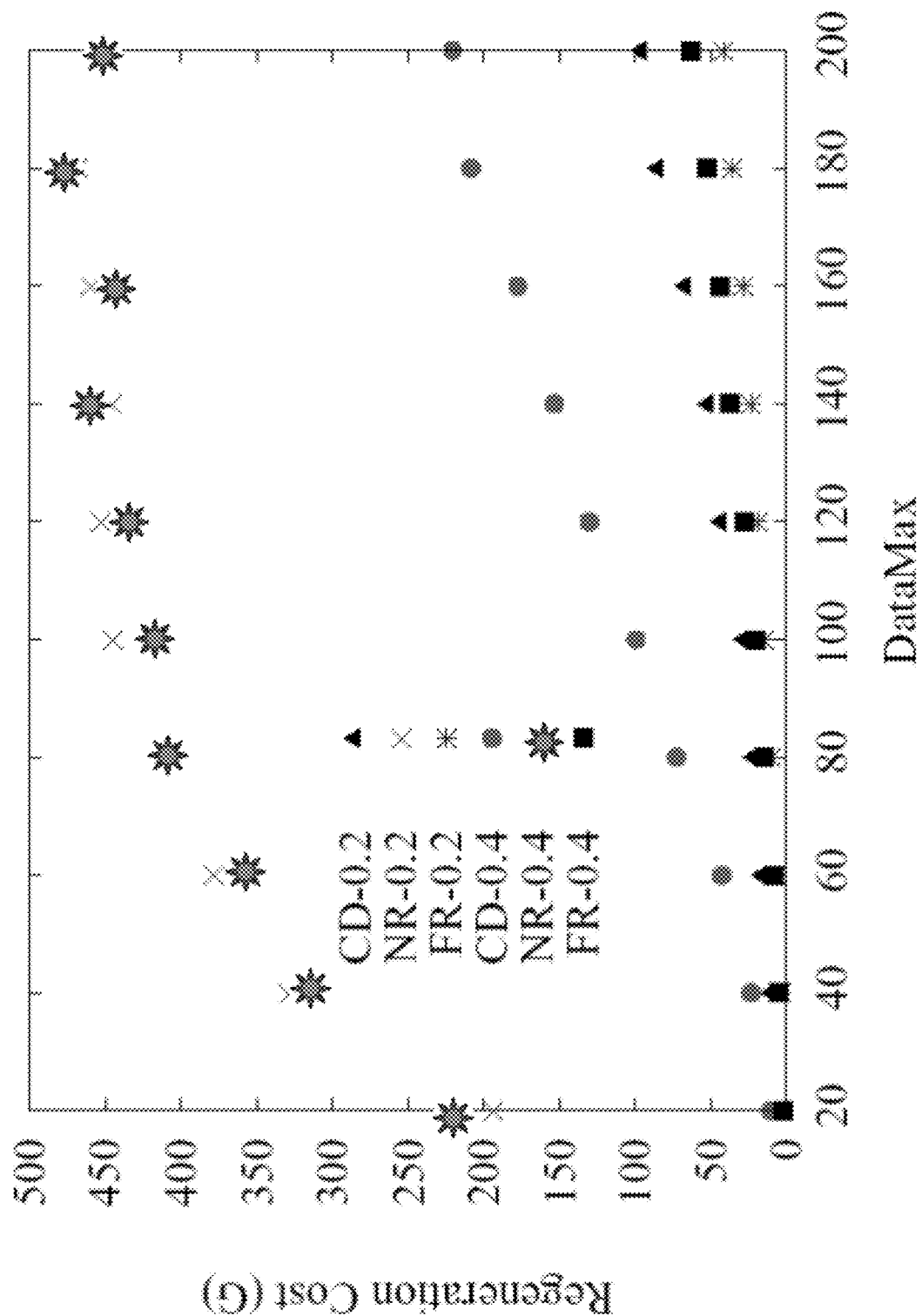
FIG. 4B illustrates examples of regeneration costs.

For example, FIG. 4A illustrates that as the amount of intermediate data increases, the reliability cost (Z) increases steadily for both FR and the example embodiments. This is expected since a larger amount of intermediate data yields higher replication costs, which in turns increases G and R. For NR, on the other hand, there is no replication cost involved, and therefore R=0 while G and Z increase as the probability of failure of the dataset increases (due to the larger value of $D_{Max}$).

Figure 4C:
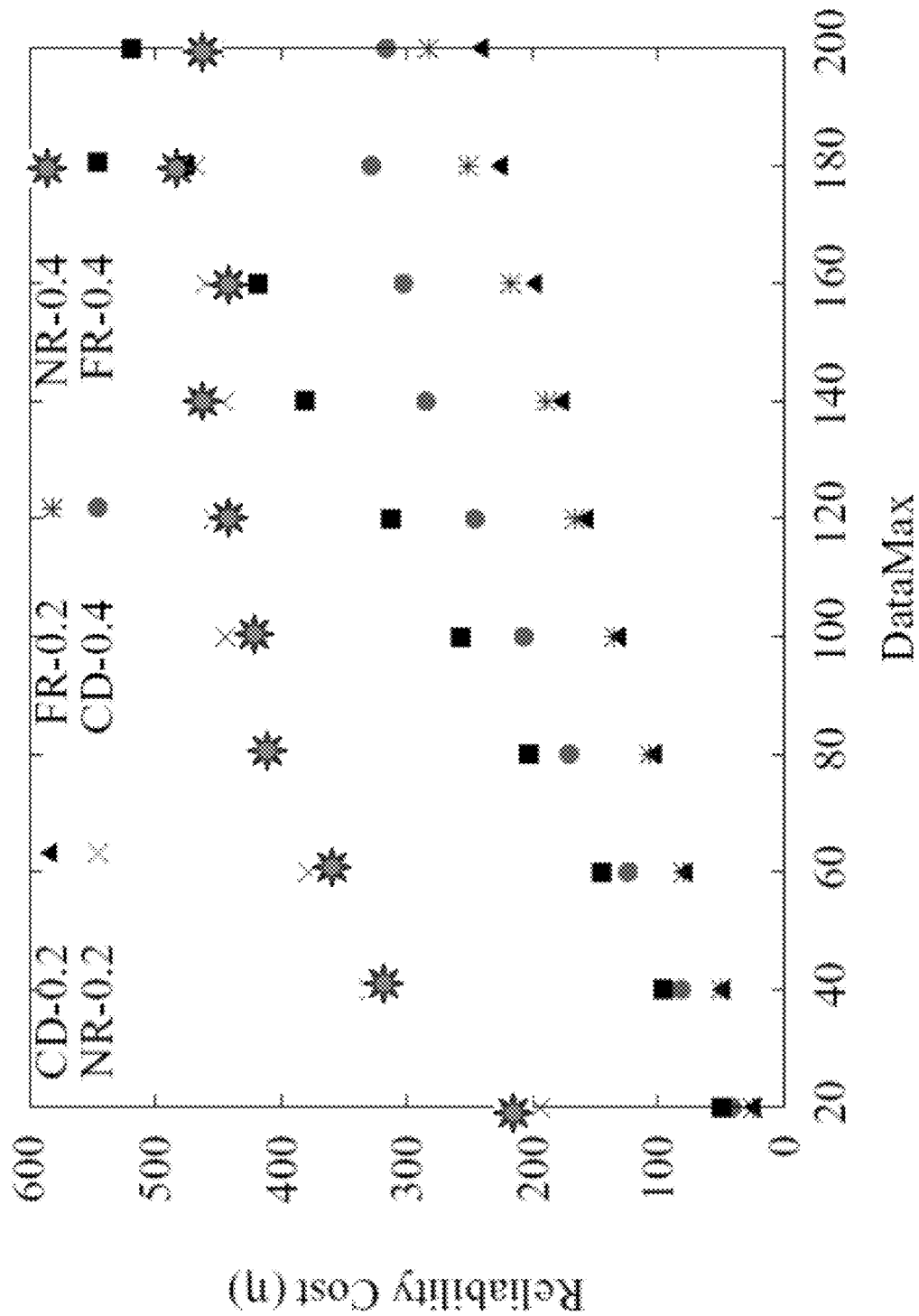
FIG. 4C illustrates examples of reliability costs.

Also, for small values of $\delta$ (0.2), both the example embodiment and FR perform similarly, as shown by the overlap of their Z curves in FIG. 4C. As observed in FIG. 4A and FIG. 4B example embodiments achieve smaller R as compared to FR, while FR performs differently than the example embodiments in terms of regeneration cost G. Such behavior is a side-effect of the higher failure probability resulting from larger values of $D_{Max}$. That is, as the failure probability increases, the example embodiments determine diminishing returns of replication, since replicas are likely to be lost due to failures. As a result, the example embodiments replicate less under such conditions. This, in turn, results in higher values of G as observed in FIG. 4B.

Figure 5A:
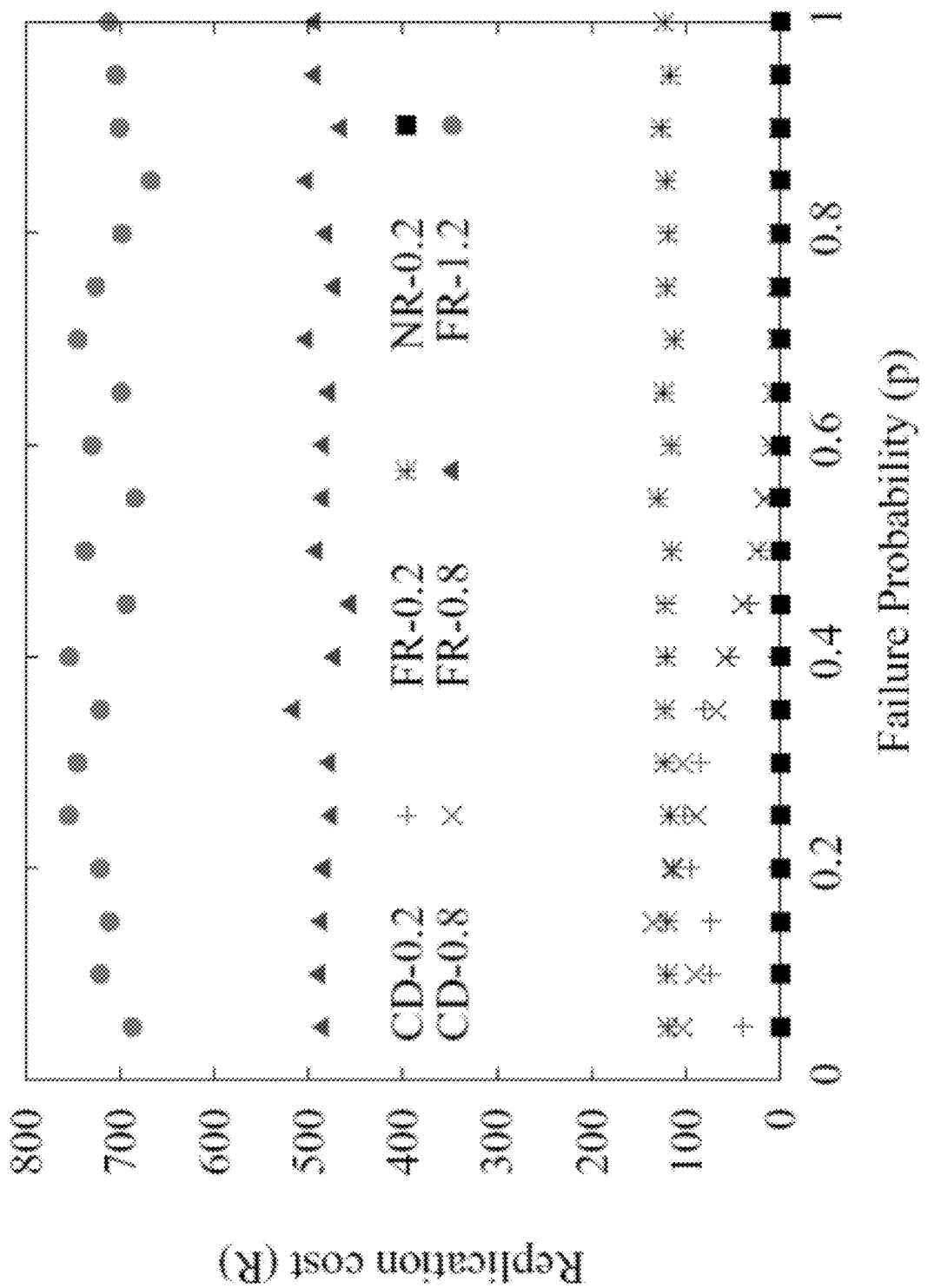
FIG. 5A illustrates examples of replication costs.
Figure 5B:
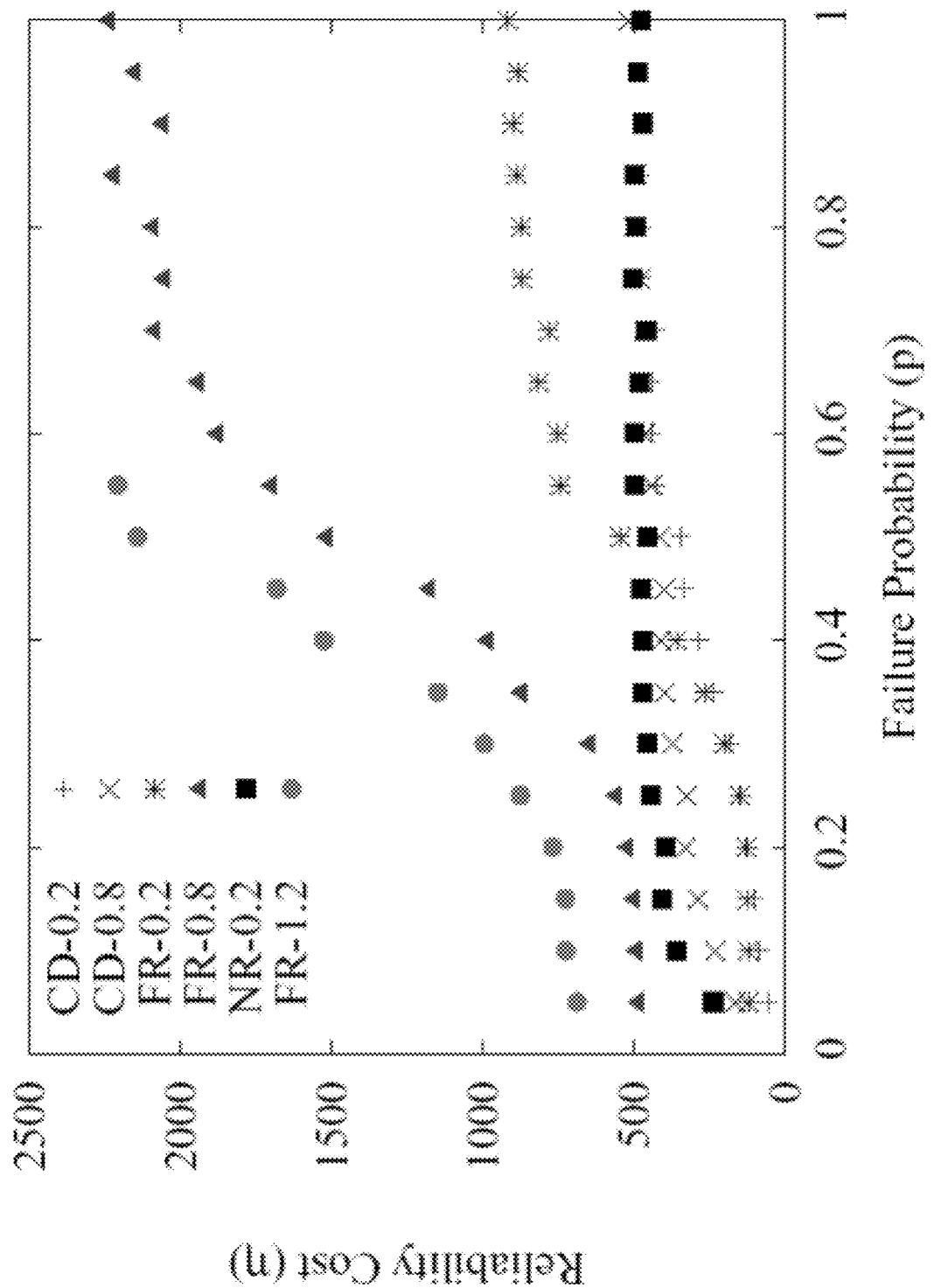
FIG. 5B illustrates examples of reliability costs.

To illustrate the effect of failure probability, FIG. 5(A-B) illustrates examples of the impact of p on the performance of example embodiments, as compared to FR and NR, by presenting G and Z for the three strategies and various values of $\delta$. It can be observed that R increases as $\delta$ increases. This fact is a consequence of the higher cost paid for replication. Furthermore, for FR the curve for Z (FIG. 5B) lays above the corresponding curves for NR and example embodiments for all values of p.

The adoption of FR has the potential of being very costly under conditions where the cost of replicating data is high. FIG. 5A illustrates that when replicating data is inexpensive, for example $\delta=0.2$, however, FR and an example embodiment performs similarly for p<0.5 (illustrated via the overlap of both curves) and an example embodiment outperforms FR for p≥0.5. This is supported by the view that, as p increases, example embodiments determine diminishing results from replicating, and thus replicate more conservatively. In a nutshell, embodiments effectively emulate FR (NR, respectively) under conditions where replication is inexpensive and (expensive, respectively), and for various levels of reliability of the storage system.

Figure 6:
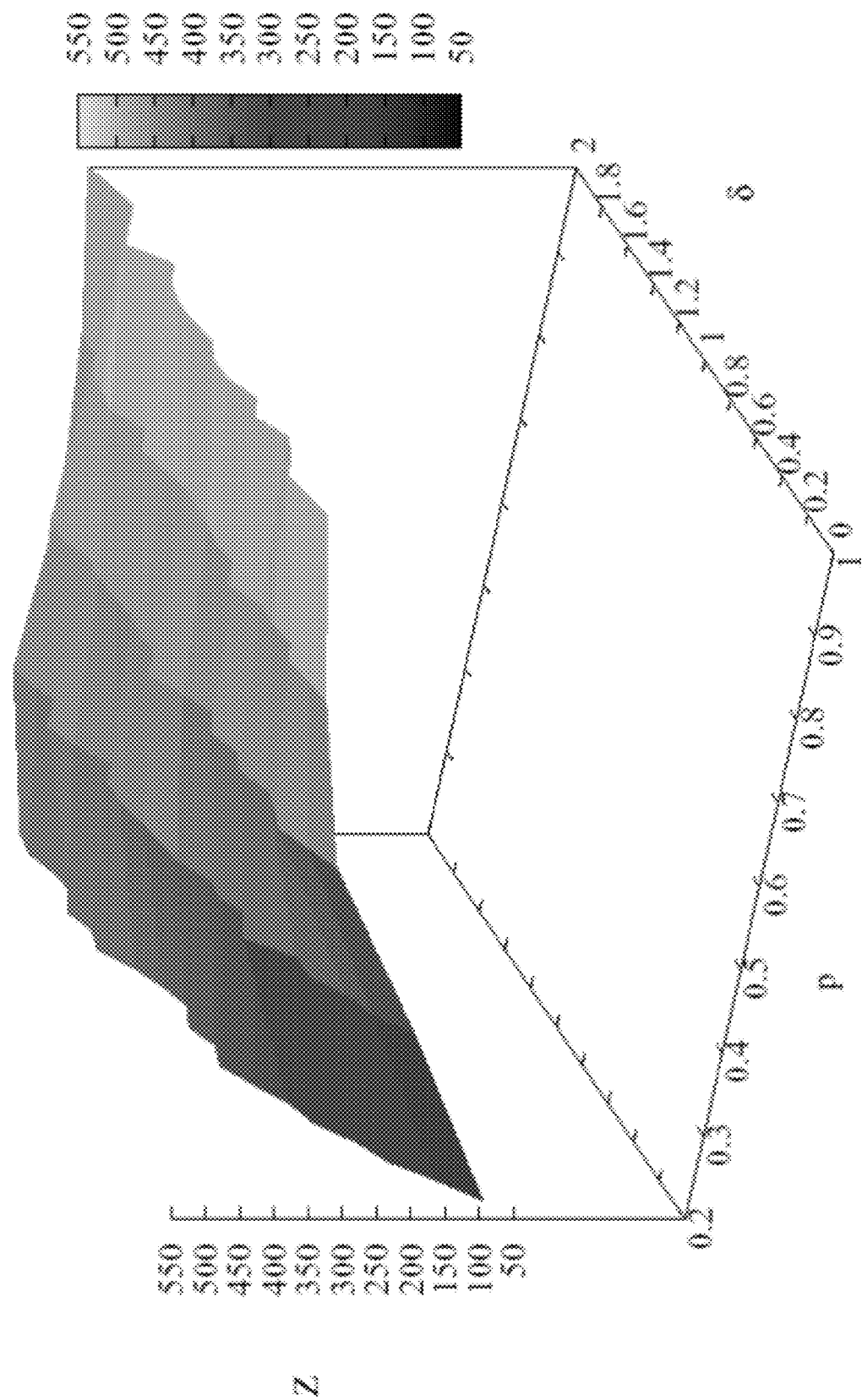
FIG. 6 illustrates a three dimensional plot of reliability cost, probability of data being unavailable due to failure, and the cost of replication.

To gain a better insight of how these parameters relate, in FIG. 6, a 3-dimensional plot is illustrated, with $\rho$ and Z in the x-axis and y-axis, respectively. $\delta$ is presented in the z-axis. FIG. 6 illustrates that for low values of p and $\delta$ an embodiment offers its best performance since R and G both remain low. When p is high and $\delta$ is low, Z is dominated by a high regeneration cost (G). Thus, the cost of computation A determines the behavior and performance of embodiments. It follows that there is a configuration for $\delta$ and p for which both G and R have equal values. This point determines the flipping point at which embodiments switch modes, and either replicate aggressively (FR) or avoid replication (NR), and it can be observed in FIG. 6 at $\delta=1$ and $p=0.25$. An embodiment is thus able to vary its performance between the performance achieved by NR and FR by intelligently adapting to the conditions of the system while minimizing the reliability cost (Z).

To illustrate the effect of storage constraints, the performance of example embodiments were evaluated under various storage constraints (for varying values of C). For this purpose, a new parameter $\sigma$ is introduced, such that $C=\sigma \times \Sigma_i^N Y_i \times x_i$, where N=4, corresponding to the 4 stages in our example and $x_i=3$, representing FR. $\sigma$ represents the fraction of the maximum capacity needed for an embodiment to fully replicate, that is, to emulate FR.

Figure 7A:
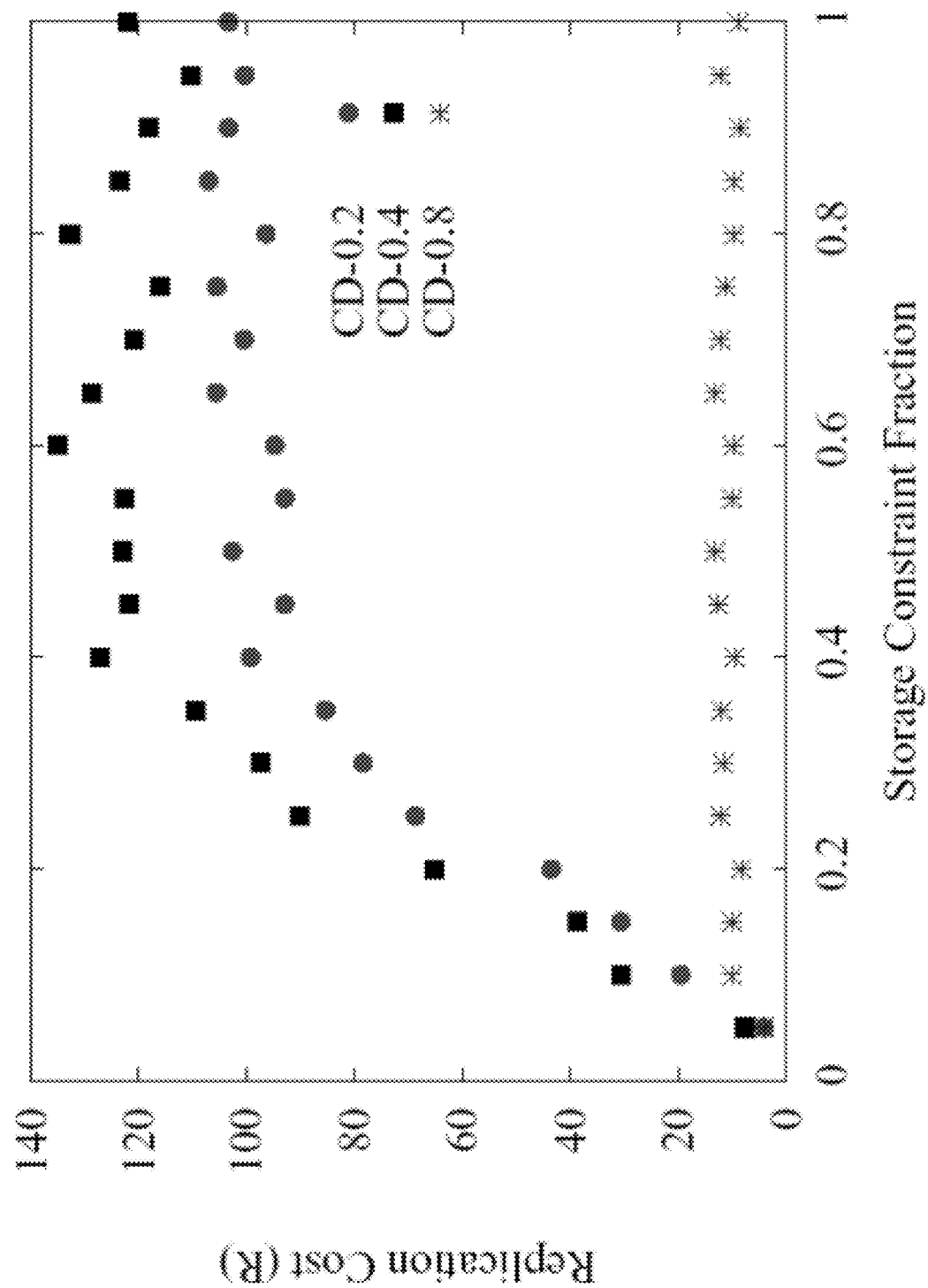
FIG. 7A illustrates examples of replication costs of various replication strategies at various storage constraint fractions.
Figure 7B:
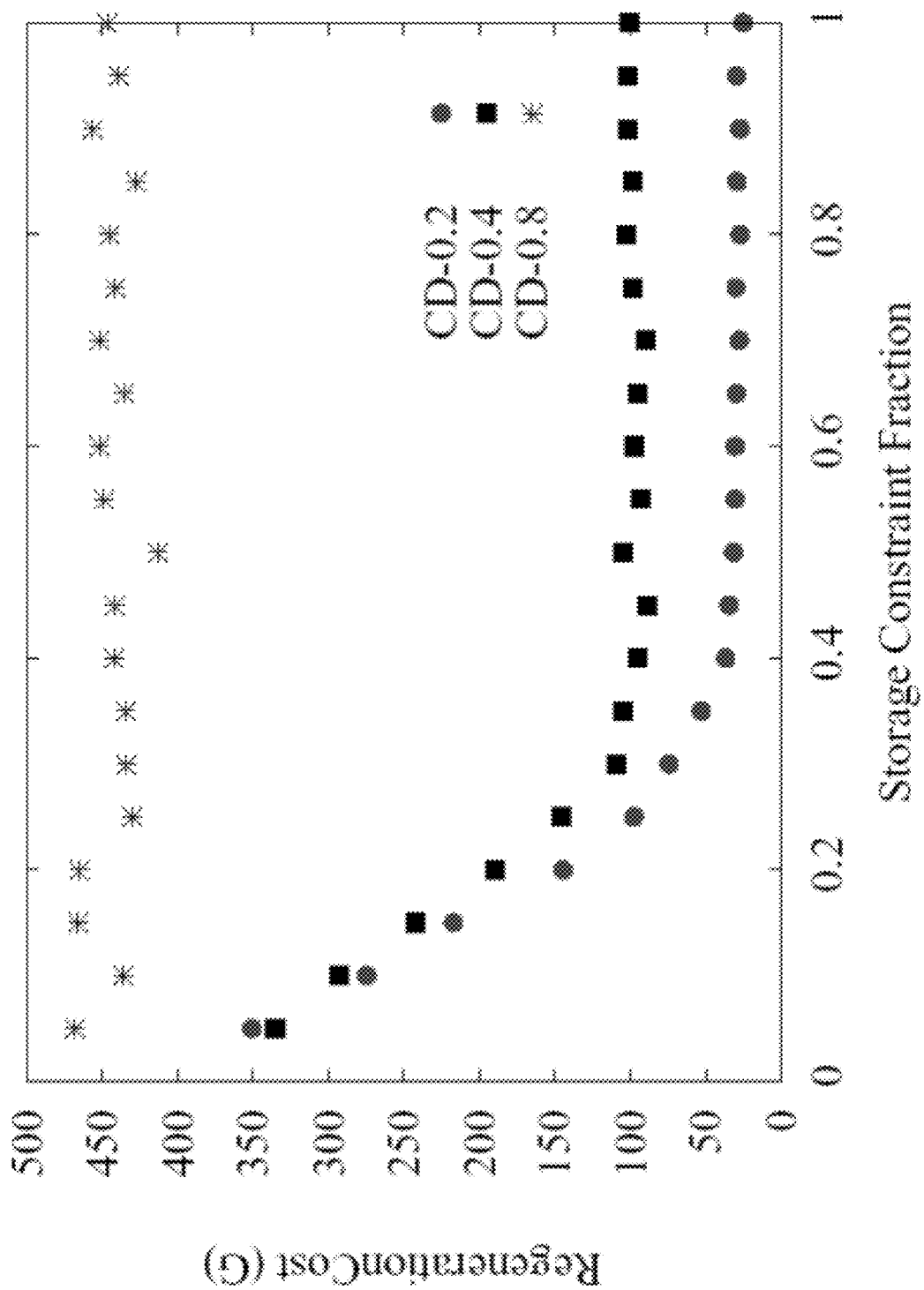
FIG. 7B illustrates examples of regeneration costs of various replication strategies at various storage constraint fractions.

FIG. 7(A-B) plots R and G as a function of $\sigma$ for various values of $\delta$. Note that for the sake of clarity, only the results for example embodiments (as compared to conventional systems) are illustrated. From FIG. 7A, it is observed that R increases with $\sigma$, that is, increases with larger C value. This follows intuition since an embodiment can replicate more data with an increase in storage. Nevertheless, as the cost of replication increases ($\delta>0:4$), R flattens out. This result shows that an embodiment uses the storage capacity available for replication efficiently, while trying to minimize the overall reliability cost. It is also noticeable that for $\delta=0:8$, an embodiment is insensitive to $\sigma$. This is expected since an embodiment avoids replicating if R is too high. In FIG. 7B, it can be observed that this results in an expensive G.

Figure 8A:
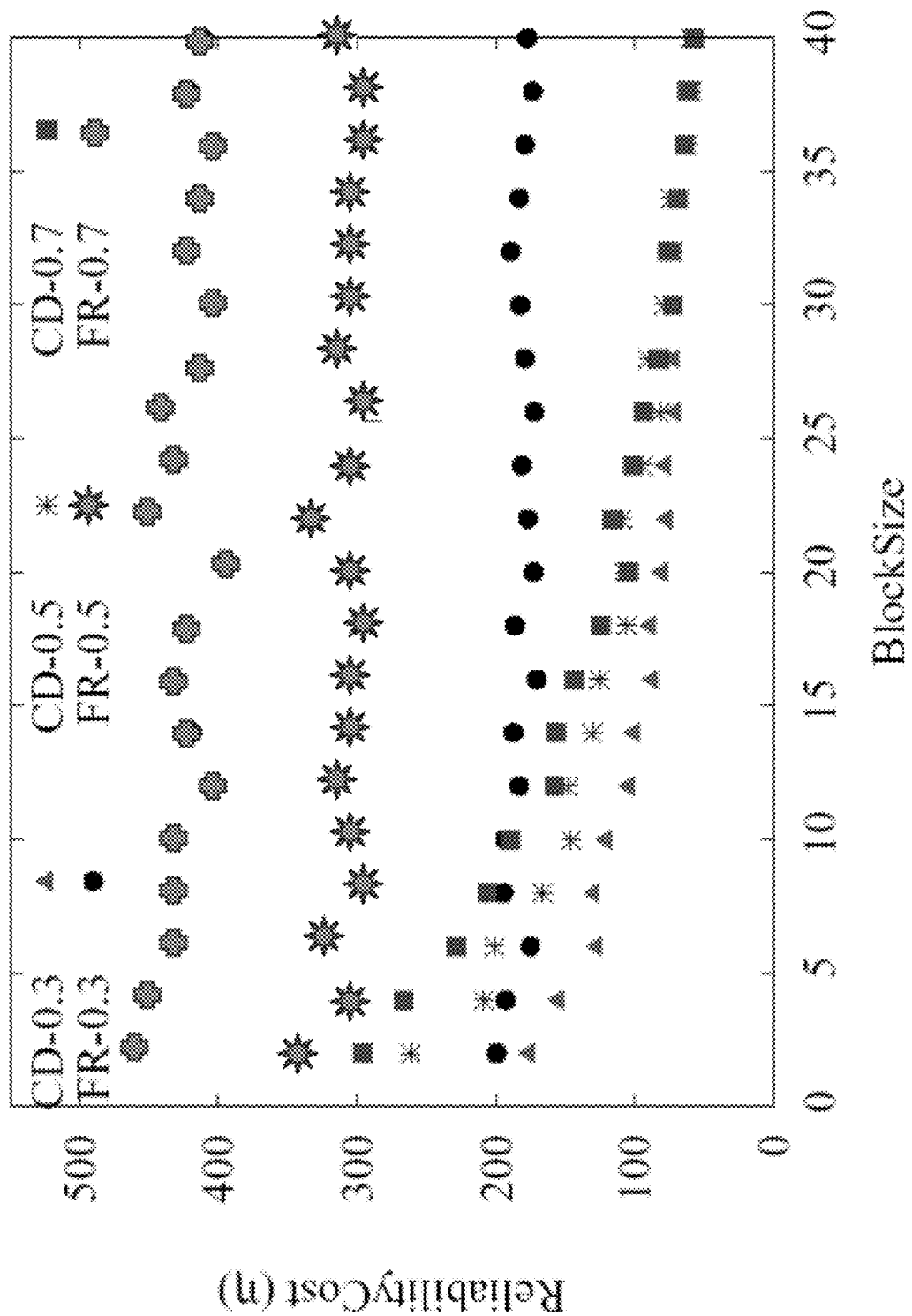
FIG. 8A illustrates examples of reliability costs of various replication strategies at various block sizes.

FIG. 8(A-B) illustrates the effect of block size by plotting the performance of embodiments and FR as a function of block size o for various values of $\delta$ (0.1, 0.3 and 0.5). For a given $D_i$ as $o_i$ increases, the number of blocks ($b_i$), across which the intermediate data set is stored decreases and therefore the probability of loosing an intermediate data set ($f(x_i)$) due to failure also decreases. An embodiment replicates more conservatively under such conditions since it does not achieve much gain from replicating data in a fairly reliable system. This approach is also supported by the steady decrease in value of R observed (not illustrated). On the other hand, FR is oblivious to varying block size and/or probability of failure. For ease of illustration, only plot Z is included in FIG. 8A. It can be observed in FIG. 8A that Z remains relatively constant for FR, while an embodiment outperforms FR consistently across the spectrum of b except when δ is very small (for example, δ=0:3). This is consistent with observations in FIG. 6.

Figure 8B:
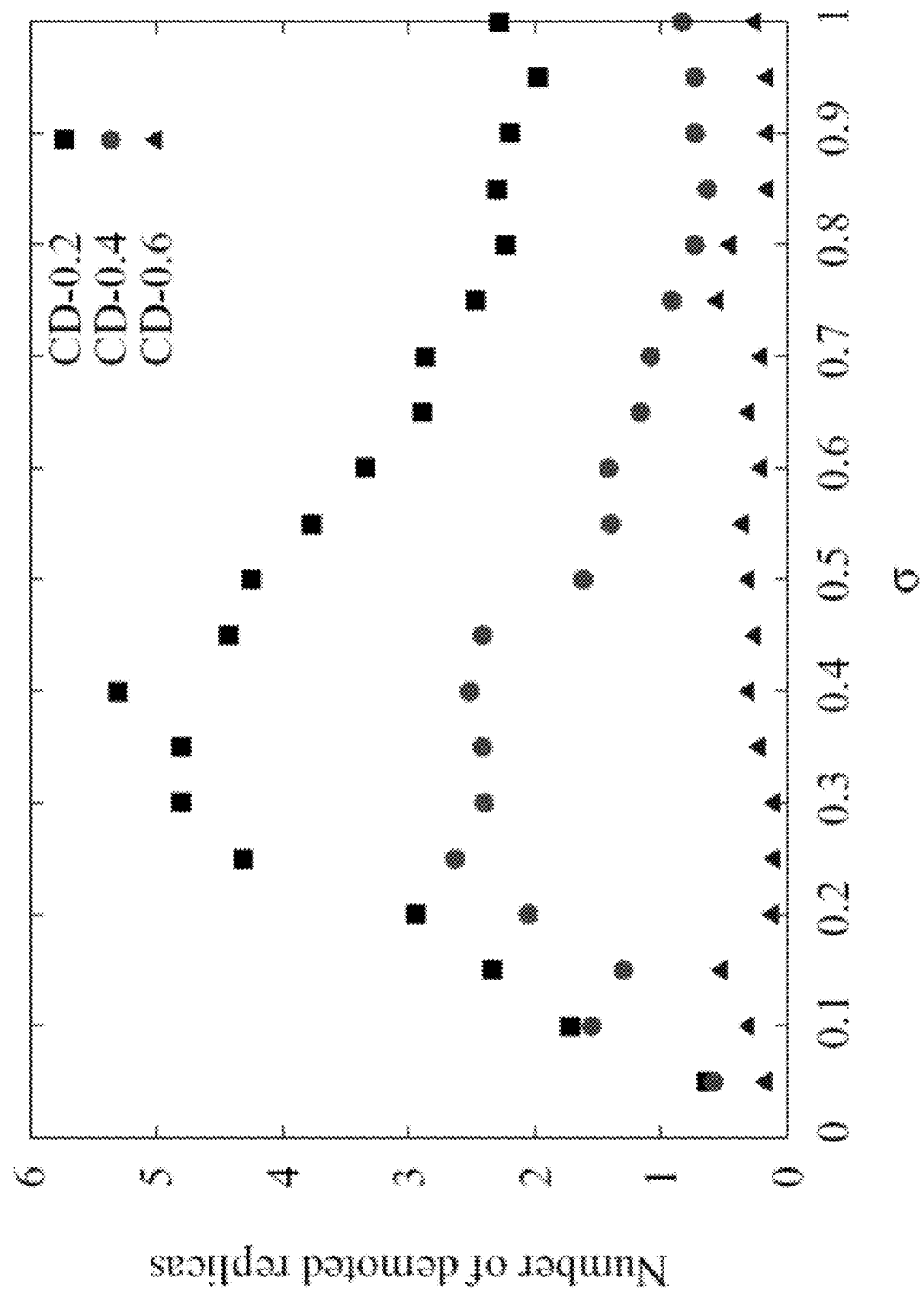
FIG. 8B illustrates examples of demoted replica(s) of various replication strategies at various storage fractions.

Finally, recall that an embodiment demotes upstream replicas in order to accommodate for downstream replicas and to maintain a minimum value of Z as the dataflow advances. This metric does not represent a deficiency; instead, it depicts mechanisms that enable adapting to the storage constraint while optimizing for Z. FIG. 8B illustrates the average number of demoted replicas as the storage constraint is relaxed, that is, by increasing σ. It can be observed in FIG. 8B that the number of demoted replicas increases as σ increases and peaks when σ<0.4 for all values of δ. This behavior may be explained as follows. For smaller values of σ, an embodiment has limited storage available for replication and hence it demotes a larger number of replicas in order to minimize Z as a dataflow advances. Additionally, note that as δ increases the average number of demoted replicas start peaking at smaller values of σ. This is a consequence of the lower replication factor when the replication cost (δ) is high.

Referring again to FIG. 1, an example system 100 is described which implements the techniques described above. The example system 100 implements a decision making framework that makes intelligent decisions regarding the replication of intermediate data for dataflows that minimize the cost of reliability. While the example implementation utilizes the testbed described herein, it should be noted again that the underlying principles behind the example apply equally to any dataflow engine.

FIG. 1 illustrates a high-level design framework in which the system 100 is a feedback control-loop system that is composed of three major components: a set of sensors 170, a controller 180 and an actuator 190. The system 100 enables resource aware reliability procedures, that is, a cost metric captures resource consumption due to reliability.

A sensor 170 is responsible for collecting resource usage statistics for running stages in the cluster and for the cluster itself. To collect such statistics, the sensor 170 relies on monitoring processes (HMON) hosted in each individual worker node. HMON continuously monitors Map-Reduce tasks. These statistics are accumulated and served to the sensor 170, such as upon request. HMON may be implemented as a Python-coded tool based on Atop, with negligible overhead (<2% CPU utilization).

A sensor 170 periodically contacts the JobTracker 110 to obtain the current progress of stages that are active or running in the cluster (steps 1-6 of FIG. 1, described further herein). When a stage has made enough progress and reaches a preconfigured threshold value, the sensor 170 contacts all the HMON processes in the cluster (step 2) and aggregates the received accounting information for the given job. This may be accomplished via a SOAP client.

A controller 180 implements the solver for the SO problem introduced previously. The controller 180 receives as input resource usage data from a sensor 170. Upon completion of a stage, the system 100 uses this data to arrive at an optimal solution consisting of a replication factor vector to include the recently completed stage as well as all previous stages upstream (step 3). In other words, the system 100 reconsiders decisions made in the past for previous stages (step 4), effectively demoting or promoting replicas when needed.

Once the controller 180 arrives at an optimal solution, the replication factors of all the completed stages have to be updated to reflect the RFM in the solution. To facilitate these modifications, an actuator 190 implements a client of the storage layer to handle modification requests. In the example illustrated in FIG. 1, the actuator 190 implements a HDFS 140 Java client 160 and uses the API call setReplication(Path file, short newReplicationFactor) at the time of its invocation (step 5) to modify the replication factor for each data set, as needed (step 6).

EXAMPLES

Results of an example system are provided herein. Two aspects discussed here are of particular interest. First, the applicability and usefulness of the example system in the context of Cloud analytic providers is of interest. Therefore, the ability to utilize resources efficiently under resource-constrained conditions is described. Second, the performance benefit perceived by the user when replication is done conservatively only if needed is of interest. This benefit depends on the replication technique used, since the overhead incurred by replication varies according to the technology. This overhead has been quantified above.

The examples use the Map-Reduce dataflow described herein (referring generally to FIG. 2). To compute $A_i$ for every stage the resource usage information obtained from HMON (FIG. 1) under the NR strategy is used. Table II presents the resource usage information for each stage of the dataflow. A simple common resource usage metric was developed to solve the SO problem. The usage for each resource was normalized by dividing each column in Table II by the sum of its corresponding row. In Table II, $CPU_S$ and $CPU_U$ stand for system and user CPU utilization, respectively. $NET_R$ and $NET_W$ represent the number of bytes received and sent over the network. $DSK_R$ and $DSK_W$ correspond to the number of bytes read from and written to disk, respectively. STG refers to the storage requirement of intermediate data output for a given stage and is known once the primary copy of the intermediate data has been stored.

TABLE II

| | Resource Usage for Data Flow. | | | |
| --- | --- | --- | --- | --- |
| | Stage | | | |
| Resource | $S_1$ | $S_2$ | $S_3$ | $S_4$ |
| $CPU_S$ (cycles) | 98764200 | 1661784 | 327588400 | 2272171 |
| $CPU_U$ (cycles) | 16801600 | 197759 | 73120700 | 709814 |

TABLE II-continued

Resource Usage for Data Flow.

| Resource | Stage | | | |
|---|---|---|---|---|
| | $S_1$ | $S_2$ | $S_3$ | $S_4$ |
| $NET_R$ (bytes) | 499482639 | 148368227457 | 482358793261 | 290260079138 |
| $NET_W$ (bytes) | 129352834157 | 147517875661 | 55905501611 | 50007380711 |
| $DSK_R$ (bytes) | 104200 | 168192 | 7870811200 | 102824128 |
| $DSK_W$ (bytes) | 12744 | 16264 | 1018375200 | 123496648 |
| STG (bytes) | 170 G | 170 G | 100 G | 70 G |

The examples illustrate an embodiment's ability to consider resource usage information available from the system while making replication decisions. Intuitively, re-executing stages that stress an already over-loaded resource can potentially hinder the performance of the system. This negative effect can be effectively prevented in an embodiment by attaching weights to the actual computing cost of stages equivalent to factors that reflect the utilization of resources in the system. Considering an example scenario of CPU constrained conditions, the CPU cost associated with each stage of a dataflow can be scaled up by a factor to reflect the higher importance of this resource. In response to this, an embodiment will tend to replicate intermediate data corresponding to such stages to minimize the regeneration cost (G).

Resource constrained conditions were not created. Instead, hooks were added to an embodiment that allows it to report various resource constrained conditions. When a sensor (for example, 170 of FIG. 1) reports a resource bottleneck, the controller (for example, 180 of FIG. 1) uses weights to increase the importance of that particular resource for the job. CPU++, NET++, DSK++ and STG++ are used to represent a scenario where CPU, network, I/O and storage resource is over utilized, respectively, and hence should be treated as an expensive or scarce resource. The following configurations were considered: $\sigma=0.08$, $\delta=0.6$ and $C=0.4$ (240 GB). Note that $\delta$ represents the replication cost and it depends on various system characteristics that include replication technology and storage. The value of is $\delta$ fixed in the examples, but may be obtained from profiling and historical information from the system.

Figure 9:
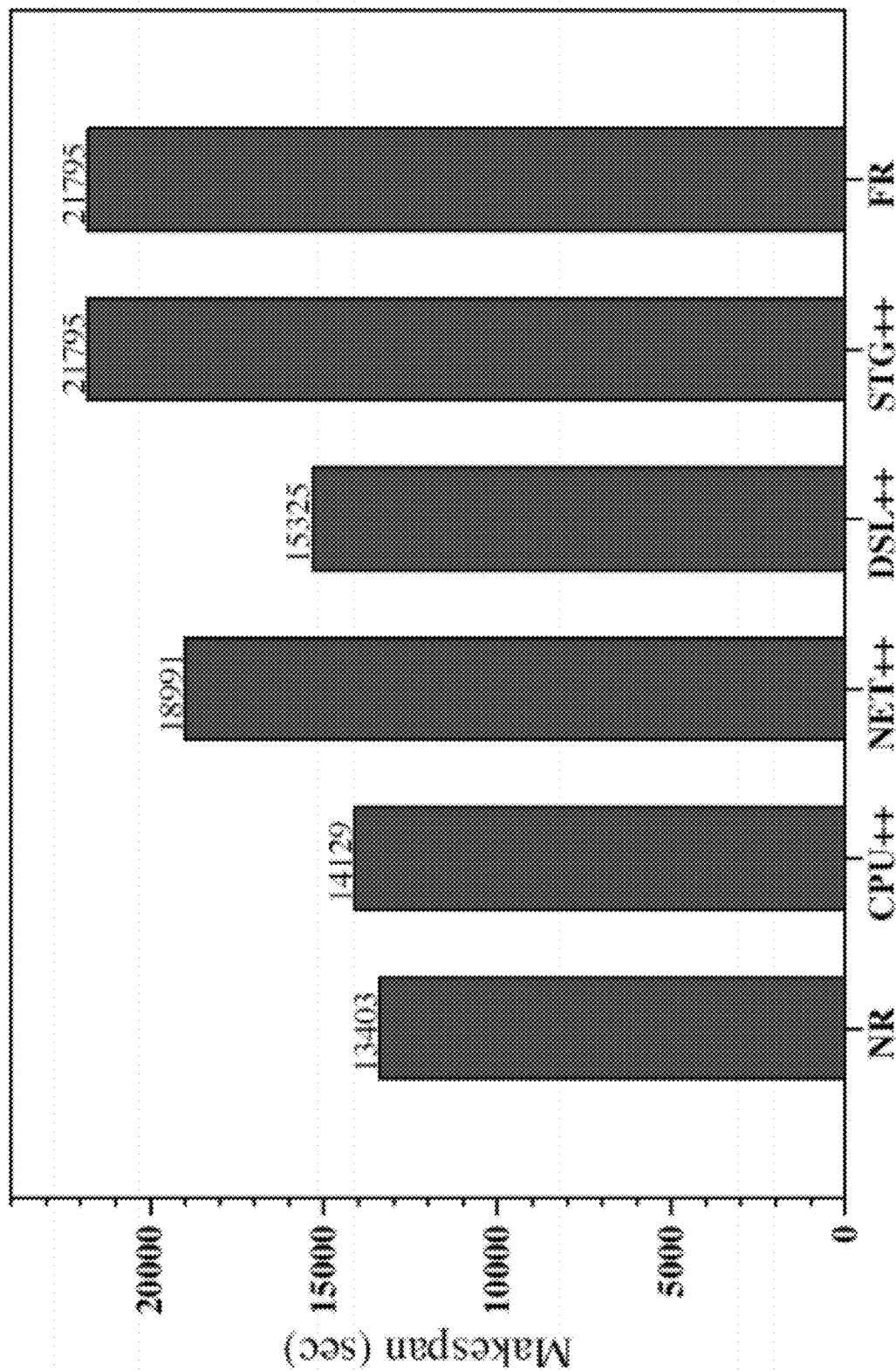
FIG. 9 illustrates example end-to-end completion times for various replication strategies.

FIG. 9 plots the results of an example embodiment's evaluation. Note that x- and y-axis represent specific scenarios and the end-to-end completion time, respectively. Table III also shows the optimal solutions provided by an example embodiment upon completion of each stage in the dataflow. As observed from FIG. 9, the end-to-end completion time of the dataflow under NR strategy is the smallest. However, the end-to-end completion time for the FR strategy ramps up by a factor of 1.62.

TABLE III

Decision Vectors for various resource usage configurations.

| CPU++ | NET++ | DSK++ | STG++ |
|---|---|---|---|
| 0 | 0 | 0 | 1 |
| 00 | 01 | 00 | 01 |
| 001 | 001 | 001 | 001 |
| 0010 | 0011 | 0011 | 0011 |

When an example embodiment reports CPU as a constrained resource (CPU++ scenario), it only replicates the third stage (Table III). This follows intuition since $S_3$ is the stage with the highest CPU consumption (by an order of magnitude more). When the network is constrained after completion of $S_2$ (NET++/DSK++ scenario), an example embodiment decides to replicate to later revert its replication decision (demote replica) to accommodate for $S_3$ and $S_4$. Recall that DSK follows a usage similar to NET because of the presence of intermediate data between the map and the reduce phase. Thus, the solutions of an example embodiment for NET++ and DSK++ are similar.

For a case where storage is expensive (STG++ scenario), an example embodiment behaves similar to FR, that is, it replicates after completion of every stage. However, due to the storage constraint imposed in the configuration (C=240 GB) an example embodiment demotes every replica (Table III). The reasoning behind this is that when storage is expensive, stages with large intermediate data sets have high regeneration cost. However, replication of their corresponding intermediate data sets will quickly exhaust the storage allocated for replication (C). As a result, such replicas are likely to be demoted as the dataflow progresses downstream while seeking to satisfy the storage constraint.

Adopting the techniques described herein in a highly unreliable environment is equivalent to adopting the NR strategy, that is, very limited benefit is attained from replication. If the system consists of relatively new hardware, it may make it difficult to evaluate the performance in the presence of failure under such conditions. Using a system with relatively new hardware, an embodiment was evaluated using the probability model introduced earlier. The HDFS (140 of FIG. 1) was modified so that it successfully retrieves each block with some probability p upon reading an input data set. Probability p is an input parameter to the system. As a reminder, when an HDFS client fails to retrieve a block, it attempts to find a replica for the given block in a remote rack. If no replica is available, the file read operation fails and the HDFS client is informed by means of an exception. A compute stage that receives such an exception when reading its corresponding input data set triggers the execution of the upstream stage in order to re-generate the input intermediate data.

Figure 10:
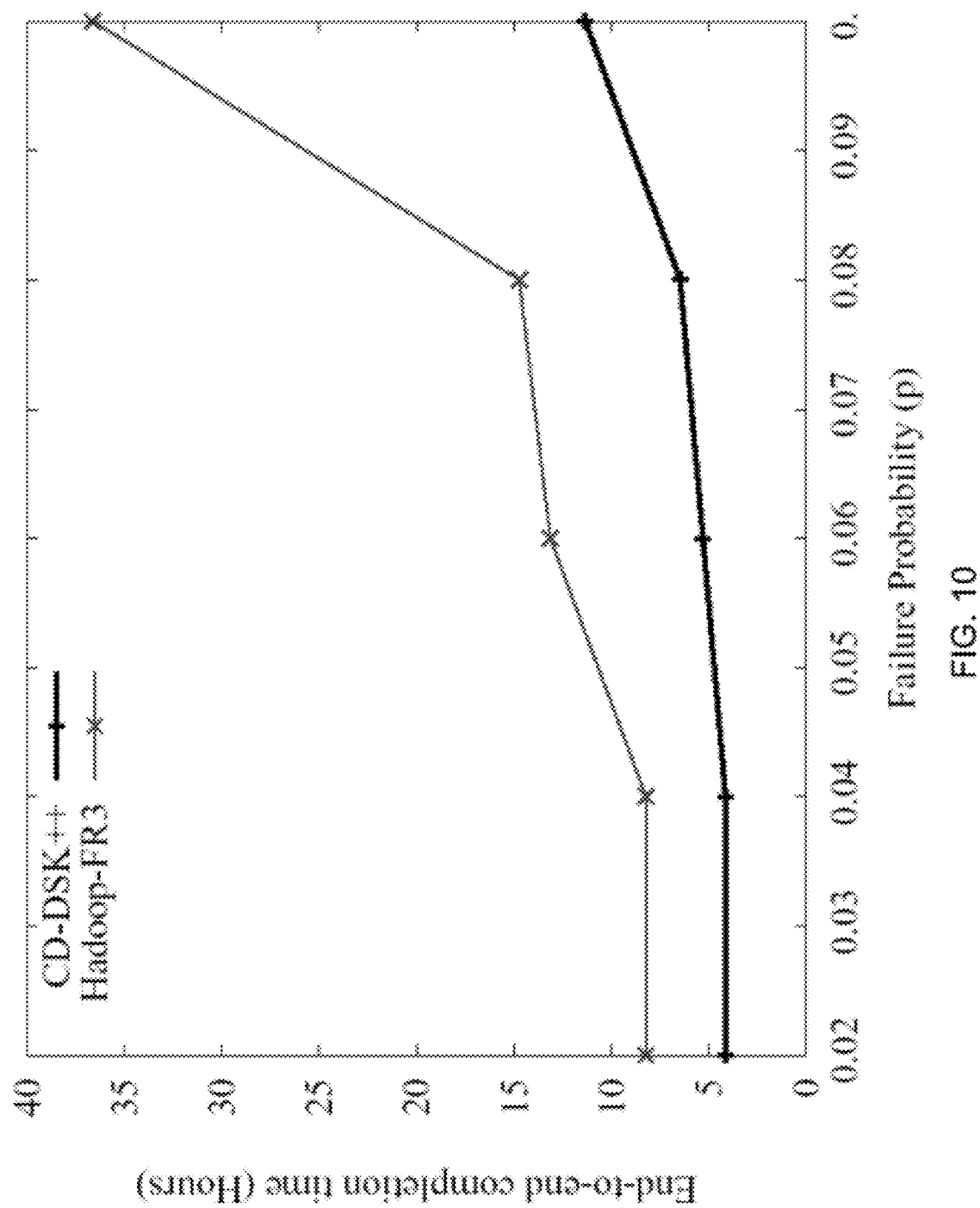
FIG. 10 illustrates example end-to-end completion times for two example replication strategies.

FIG. 10 illustrates the end-to-end completion time for an example embodiment (CD-DSK++) and traditional Hadoop with 3 replicas per file (denoted by Hadoop-FR3), and for an example embodiment, when CPU is the resource bottleneck. Each data point corresponds to an average of three experimental runs. FIG. 10 illustrates that an example embodiment is able to reduce the end-to-end completion time by up to 70% for p=0.1. A closer look at that data traces shows that various stages were re-executed due to the injected failures through out the execution of the dataflow. Stage $S_2$ re-executed more frequently due to its large input data set. Also, the traces show that $S_1$ for p=0.06, p=0.08 and p=0.1 was re-executed 3, 1 and 21 times, respectively. Note that an example embodiment achieves its performance gain from replicating only $S_3$ with $x_3=1$, as shown in Table III. These results were found to be similar under any other resource contention scenario.

It is understood that although this disclosure includes references to cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. Such a cloud model may include at least five characteristics, at least three service models, and at least four deployment models.

Some example characteristics are as follows: On-demand self-service: a cloud consumer can unilaterally provision computing capabilities, such as server time and network storage, as needed automatically without requiring human interaction with the service's provider. Broad network access: capabilities are available over a network and accessed through standard mechanisms that promote use by heterogeneous thin or thick client platforms (for example, mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Some example service models are as follows: Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Some example deployment models are as follows: Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (for example, mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (for example, cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 11:
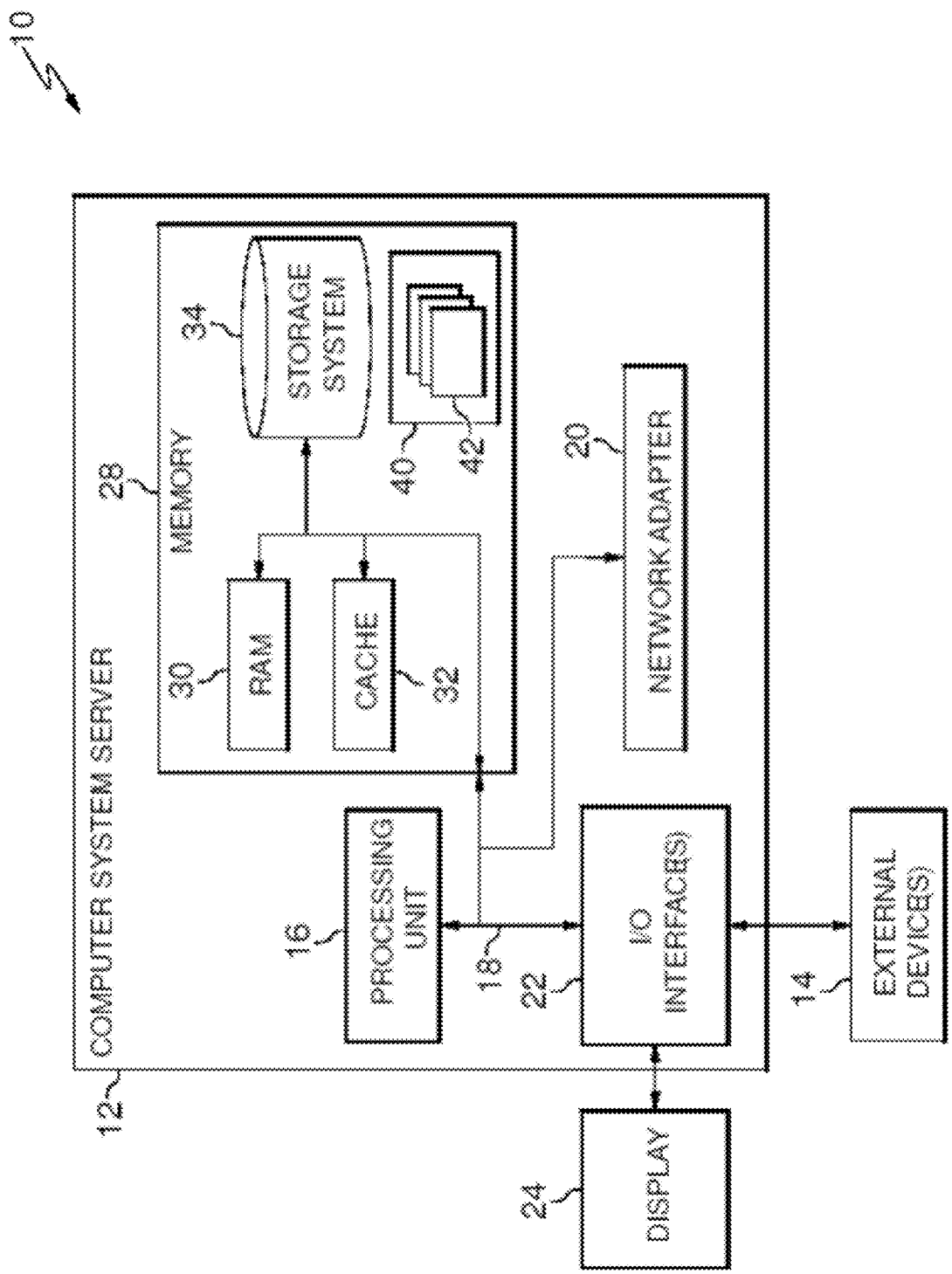
FIG. 11 illustrates an example cloud computing node.

Referring now to FIG. 11, a schematic of an example of a cloud computing node is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth herein, for example that of system 100 or components thereof.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (for example, a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, et cetera; one or more devices that enable a user to interact with computer system/server 12; and/or any devices (for example, network card, modem, et cetera) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (for example, the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, et cetera.

A cloud computing environment may comprise one or more cloud computing nodes 10 with which local computing devices used by cloud consumers, such as, for example, personal digital assistant (PDA) or cellular telephone, desktop computer, laptop computer, et cetera may communicate. Nodes 10 may communicate with one another. They may be grouped physically or virtually, in one or more networks, such as Private, Community, Public, or Hybrid clouds as described herein, or a combination thereof. This allows cloud computing environment to offer infrastructure, platforms and/or software as services for which a cloud consumer does not need to maintain resources on a local computing device. It is understood that the types of computing devices mentioned herein are intended to be illustrative only and that computing nodes 10 and cloud computing environment can communicate with any type of computerized device over any type of network and/or network addressable connection (for example, using a web browser).

Generally a set of functional abstraction layers may be provided by a cloud computing environment. It should be understood that the components, layers, and functions of a cloud computing environment referenced herein are intended to be illustrative only and embodiments are not limited thereto. The following layers and corresponding functions may for example be provided.

Hardware and software layer may includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. IBM, zSeries, pSeries, xSeries, BladeCenter, WebSphere, and DB2 are trademarks of International Business Machines Corporation registered in many jurisdictions worldwide.

Virtualization layer provides an abstraction layer from which the following examples of virtual entities may be provided: virtual servers; virtual storage; virtual networks, including virtual private networks; virtual applications and operating systems; and virtual clients. In one example, management layer may provide functions such as the following.

Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer may provide the following examples of functionality for which the cloud computing environment may be utilized. Examples of workloads and functions which may be provided from this layer include: mapping and navigation; software development and lifecycle management; virtual classroom education delivery; data analytics processing; transaction processing; and cost-aware replication of intermediate data in dataflows.

As will be appreciated by one skilled in the art, aspects may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A computer program product comprising:
a non-transitory computer readable storage medium having computer readable program code embodied therewith, the computer readable program code comprising:
computer readable program code configured to receive at least one measurement indicative of a reliability cost associated with executing a dataflow;
computer readable program code configured to compute a degree of replication of at least one intermediate data set in the dataflow based on the reliability cost;
wherein the reliability cost comprises a metric based at least on a sum of two sub-costs, the two sub-costs comprising a cost of replication for the at least one intermediate data set in the dataflow and a cost of regeneration for the at least one intermediate data set in the dataflow;
computer readable program code configured to minimize the reliability cost; and
computer readable program code configured to communicate at least one replication factor, corresponding to the computed degree of replication, to at least one component responsible for replication of the at least one intermediate data set in the dataflow;
wherein the at least one intermediate data set is replicated according to the replication factor.

2. The computer program product according to claim 1, wherein the at least one measurement indicative of a reliability cost associated with executing the dataflow includes at least one measurement relevant to determining how much intermediate data to replicate at one or more stages of the dataflow.

3. The computer program product according to claim 1, wherein to compute at least one replication factor further comprises solving a constrained optimization problem.

4. The computer program product according to claim 3, wherein the constrained optimization problem takes into account at least one of the cost of replication for the at least one intermediate data set in the dataflow and the cost of regeneration for the at least one intermediate data set in the dataflow.

5. The computer program product according to claim 4, wherein the cost of replication comprises a cost incurred for at least one of creating or destroying replicas of the at least one intermediate data set in the dataflow.

6. The computer program product according to claim 4, wherein the cost of regeneration comprises a cost of regenerating the at least one intermediate data set in the dataflow.

7. The computer program product according to claim 1, wherein the at least one measurement indicative of a reliability cost associated with executing the dataflow is obtained from at least one sensor that monitors compute stages in the dataflow at run time.

8. The computer program product according to claim 1, wherein the computer readable program code configured to compute a degree of replication of at least one intermediate data set in the dataflow is further configured to compute a degree of replication responsive to at least one of:
a predetermined, periodic timing mechanism; and
a completion of a compute stage in the dataflow.

9. The computer program product according to claim 1, wherein the at least one replication, factor comprises at least one of:
an instruction to replicate an intermediate data set of the dataflow for a particular stage; and
an instruction to delete a replica for an intermediate data set of the dataflow already replicated for a particular stage.

10. The computer program product according to claim 1, wherein the dataflow comprises a stage wise data computation process in which at least one subsequent stage depends on an intermediate data set computed at a preceding stage.

11. The computer program product according to claim 1, further comprising computer readable program code configured to provide software as a service in a distributed computing environment.

12. A method comprising:
receiving at least one measurement indicative of a reliability cost associated with executing a dataflow;
computing a degree of replication of at least one intermediate data set in the dataflow based on the reliability cost;
wherein the reliability cost comprises a metric based at least on a sum of two sub-costs, the two sub-costs comprising a cost of replication for the at least one intermediate data set in the dataflow and a cost of regeneration for the at least one intermediate data set in the dataflow;
minimizing the reliability cost; and
communicating at least one replication factor, corresponding to the computed degree of replication, to at least one component responsible for replication of the at least one intermediate data set in the dataflow;
wherein the at least one intermediate data set is replicated according to the replication factor.

13. The method according to claim 12, wherein to compute at least one replication factor further comprises solving a constrained optimization problem.

14. The method according to claim 13, wherein the constrained optimization problem takes into account at least one of the cost of replication for the at least one intermediate data set in the dataflow and the cost of regeneration for the at least one intermediate data set in the dataflow.

15. The method according to claim 14, wherein the cost of replication comprises a cost incurred for at least one of creating or destroying replicas of the at least one intermediate data set in the dataflow.

16. The method according to claim 14, wherein the cost of regeneration comprises a cost of regenerating the at least one intermediate data set in the dataflow.

17. The method according to claim 12, wherein the at least one measurement indicative of a reliability cost associated with executing the dataflow is obtained from at least one sensor that monitors compute stages in the dataflow at run time.

18. The method according to claim 12, wherein computing a degree of replication of at least one intermediate data set in the dataflow further comprises computing a degree of replication responsive to at least one of:
a predetermined, periodic timing mechanism; and
a completion of a compute stage in the dataflow.

19. The method according to claim 12, wherein the at least one replication factor comprises at least one of:
an instruction to replicate an intermediate data set of the dataflow for a particular stage; and
an instruction to delete a replica for an intermediate data set of the dataflow already replicated for a particular stage.

20. The method according to claim 12, wherein the dataflow comprises a stage wise data computation process in which at least one subsequent stage depends on an intermediate data set computed at a preceding stage.

21. The method according to claim 12, further comprising providing software as a service in a distributed computing environment.

22. A system comprising:
at least one processor; and
a memory device operatively connected to the at least one processor;
wherein, responsive to execution of program instructions accessible to the at least one processor, the at least one processor is configured to:
receive at least one measurement indicative of a reliability cost associated with executing a dataflow;
compute a degree of replication of at least one intermediate data set in the dataflow based on the reliability cost;
wherein the reliability cost comprises a metric based at least on a sum of two sub-costs, the two sub-costs comprising a cost of replication for the at least one intermediate data set in the dataflow and a cost of regeneration for the at least one intermediate data set in the dataflow;
minimize the reliability cost; and
communicate at least one replication factor, corresponding to the computed degree of replication, to at least one component responsible for replication of the at least one intermediate data set in the dataflow;
wherein the at least one intermediate data set is replicated according to the replication factor.

* * * * *